(12) United States Patent
Sung et al.

(10) Patent No.: US 10,866,417 B2
(45) Date of Patent: Dec. 15, 2020

(54) LENS UNIT AND SEE-THROUGH TYPE DISPLAY APPARATUS INCLUDING THE SAME

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Geeyoung Sung, Daegu (KR); Hongseok Lee, Seoul (KR); Byoungho Lee, Seoul (KR); Changkun Lee, Seoul (KR); Seokil Moon, Seoul (KR); Jongyoung Hong, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 285 days.

(21) Appl. No.: 15/788,402

(22) Filed: Oct. 19, 2017

(65) Prior Publication Data

US 2018/0107000 A1 Apr. 19, 2018

(30) Foreign Application Priority Data

Oct. 19, 2016 (KR) .................. 10-2016-0135926

(51) Int. Cl.
*G02B 27/01* (2006.01)
*G02B 27/28* (2006.01)
(Continued)

(52) U.S. Cl.
CPC ........... *G02B 27/0172* (2013.01); *G02B 3/10* (2013.01); *G02B 3/14* (2013.01); *G02B 5/3083* (2013.01);
(Continued)

(58) Field of Classification Search
CPC ............ G02B 27/0172; G02B 27/01; G02B 27/0101; G02B 27/0149; G02B 27/017;
(Continued)

(56) References Cited

U.S. PATENT DOCUMENTS 6,816,314 B2 11/2004 Shimizu et al.
2004/0108971 A1* 6/2004 Waldern ............ G02B 27/0093
345/8
(Continued)

FOREIGN PATENT DOCUMENTS

JP 200290687 A 3/2002
JP 3413885 B2 6/2003
(Continued)

OTHER PUBLICATIONS

Communication dated Mar. 6, 2018, from the European Patent Office in counterpart European Application No. 17196912.4.
(Continued)

*Primary Examiner* — Kristina M Deherrera
(74) *Attorney, Agent, or Firm* — Sughrue Mion, PLLC

(57) ABSTRACT

A see-through type display apparatus includes a see-through type optical system configured to transmit a first image via a first-path light, which is light traveling on a first path, to an ocular organ of a user, and a second image via a second-path light, which is light traveling on a second path, to the ocular organ of the user; and an incident light-dependent lens unit provided between the see-through type optical system and the ocular organ of the user and having different refractive powers according to characteristics of incident light, where the incident light-dependent lens unit has a positive first refractive power with respect to the first-path light and has a second refractive power different from the first refractive power with respect to the second-path light.

18 Claims, 19 Drawing Sheets
(1 of 19 Drawing Sheet(s) Filed in Color)

(51) Int. Cl.
  G02B 5/30      (2006.01)
  G02F 1/29      (2006.01)
  G02B 3/10      (2006.01)
  G02B 3/14      (2006.01)
  G02B 27/14     (2006.01)
  G02C 7/02      (2006.01)
  G02C 7/06      (2006.01)

(52) U.S. Cl.
  CPC ............ *G02B 27/283* (2013.01); *G02F 1/293* (2013.01); *G02B 27/144* (2013.01); *G02B 2027/011* (2013.01); *G02B 2027/0123* (2013.01); *G02B 2027/0178* (2013.01); *G02C 7/022* (2013.01); *G02C 7/06* (2013.01); *G02F 2001/294* (2013.01)

(58) Field of Classification Search
  CPC .. G02B 27/0176; G02B 27/0179; G02B 3/10; G02B 3/14; G02B 27/283; G02B 5/3083; G02B 27/144; G02B 2027/011; G02B 2027/0178; G02B 2027/0114; G06T 19/006; H04N 13/044; H04N 13/00; H04N 5/7491; G02C 11/00; G02C 7/022; G02C 7/06; G02F 1/293; G02F 2001/294
  USPC ........................................................ 359/299
  See application file for complete search history.

(56) References Cited

U.S. PATENT DOCUMENTS

| | | |
|---|---|---|
| 2009/0141216 A1 | 6/2009 | Marrucci |
| 2012/0147038 A1 | 6/2012 | Perez et al. |
| 2012/0229367 A1 | 9/2012 | Magyari |
| 2012/0249899 A1 | 10/2012 | Berthelot et al. |
| 2015/0301356 A1 | 10/2015 | Tabirian et al. |
| 2017/0227777 A1* | 8/2017 | Carollo .............. G02B 27/0176 |
| 2017/0357092 A1* | 12/2017 | Griffin ..................... G02B 3/10 |

FOREIGN PATENT DOCUMENTS

| | | |
|---|---|---|
| JP | 2012159681 A | 8/2012 |
| WO | 2016092285 A1 | 6/2016 |

OTHER PUBLICATIONS

Nelson V. Tabiryan et al. "Thin waveplate lenses of switchable focal length—new generation in optics" Optics Express, Sep. 22, 2015, vol. 23, No. 20 (12 pages total) (XP055348699).

Kim J et al: "Fabrication of ideal geometric-phase holograms with arbitrary wavefronts", vol. 2, No. 11, Nov. 15, Optica, pp. 958-964, (7 pages total).

"An Introduction to Polarization Directed Flat Lenses", Edmund Optics Worldwide, Oct. 2016, (16 pages total).

Communication dated Dec. 12, 2019 issued by the European Patent Office in counterpart European Application No. 17 196 912.4.

Oliver Bimber et al., "Near-Eye Displays", Displays: Fundamentals, applications, and outlook, Chapter 10, CRC Press, XP055572703, Jul. 5, 2011, pp. 439-504.

* cited by examiner

< FLAT PLATE MODE >        < LENS MODE >

LENS UNIT AND SEE-THROUGH TYPE DISPLAY APPARATUS INCLUDING THE SAME

CROSS-REFERENCE TO RELATED APPLICATION

This application claims priority from Korean Patent Application No. 10-2016-0135926, filed on Oct. 19, 2016 in the Korean Intellectual Property Office, the disclosure of which is incorporated herein in its entirety by reference.

BACKGROUND

1. Field

Example embodiments of the present disclosure relate to optical elements and display apparatuses including the same, and more particularly, to lens units and see-through type display apparatuses including the same.

2. Description of the Related Art

Recently, as electronic apparatuses and display apparatuses capable of generating virtual reality (VR) have been developed, interest in such apparatuses has increased. As a next step of VR, technologies or methods to generate augmented reality (AR) and mixed reality (MR) have been researched.

Unlike VR that is completely based on a virtual world, AR is a display technology that shows the real world in combination with virtual objects or information overlapped thereon, thereby further increasing the realistic effects. While VR is generally limited to fields such as games or virtual experience, AR may be applied to various environments in the real world. In particular, AR has attracted attention as the next-generation display technology suitable for a ubiquitous environment or an Internet of Things (IoT) environment. AR may be an example of MR as AR presents a mixture of the real world and additional information (i.e., the virtual world).

SUMMARY

One or more example embodiments provide see-through type display apparatuses that may be applied to implement (generate) augmented reality (AR) or mixed reality (MR).

One or more example embodiments also provide see-through type display apparatuses having excellent performance.

One or more example embodiments also provide see-through type display apparatuses that have a wide viewing angle (or angle of view).

One or more example embodiments also provide see-through type display apparatuses having a compact configuration.

One or more example embodiments also provide lens units that may be applied to the see-through type display apparatuses.

One or more example embodiments also provide lens units having a focal length varying according to characteristics of incident light.

One or more example embodiments also provide electronic apparatuses including the see-through type display apparatuses.

According to an aspect of an example embodiment, there is provided a see-through type display apparatus including: a see-through type optical system configured to transmit a first image via a first-path light, which is light traveling on a first path, to an ocular organ of a user, and a second image via a second-path light, which is light traveling on a second path, to the ocular organ of the user; and an incident light-dependent lens unit provided between the see-through type optical system and the ocular organ of the user and having different refractive powers according to characteristics of incident light, wherein the incident light-dependent lens unit has a positive first refractive power with respect to the first-path light and has a second refractive power different from the first refractive power with respect to the second-path light.

The incident light-dependent lens unit may have a refractive power equal to 0 or substantially equal to 0 with respect to the second-path light.

The incident light-dependent lens unit may be configured to have different refractive powers according to polarization directions of the incident light.

The incident light-dependent lens unit may include: a first lens having a focal length varying according to polarization directions of the incident light; and a second lens provided adjacent to the first lens and having a constant focal length regardless of the polarization directions of the incident light.

The first lens may have a positive first focal length with respect to the first-path light when the first-path light is incident on the first lens and has a first polarization direction and may have a negative second focal length with respect to the second-path light when the second-path light is incident on the first lens and has a second polarization direction, and the second lens may have a positive third focal length with respect to the first-path light when the first-path light is incident on the second lens and has the first polarization direction and the second-path light when the second-path light is incident on the second lens and has the second polarization direction.

An absolute value of the first focal length and an absolute value of the second focal length may be equal to each other.

An absolute value of the second focal length and an absolute value of the third focal length may be equal to each other.

The incident light-dependent lens unit may have a focal length corresponding to half ($\frac{1}{2}$) of the first focal length with respect to the first-path light having the first polarization direction, and the incident light-dependent lens unit may have an infinite or substantially infinite focal length with respect to the second-path light having the second polarization direction.

The first polarization direction and the second polarization direction may be orthogonal to each other.

The first lens may be a flat plate type lens, and the second lens may be a convex lens.

The first image may be an image formed and provided by the see-through type display apparatus, and the second image may be an outside image that the user faces through the see-through type display apparatus.

The see-through type optical system may include: an image forming device configured to form the first image; and a polarization beam splitter (PBS) configured to transmit the first image formed by the image forming device to the ocular organ of the user, wherein the second image may be transmitted through the PBS to the ocular organ of the user.

The see-through type optical system may further include a quarter-wave plate (QWP) arranged between the polarization beam splitter (PBS) and the incident light-dependent lens unit.

The see-through type optical system may include: an image forming device configured to form the first image; a transflective member configured to transmit the first image formed by the image forming device to the ocular organ of the user; a first polarizer provided between the transflective member and the image forming device; and a second polarizer facing the incident light-dependent lens unit with the transflective member interposed between the second polarizer and the incident light-dependent lens unit, wherein the second image may be transmitted through the transflective member to the ocular organ of the user.

The see-through type optical system may further include a quarter-wave plate (QWP) provided between the transflective member and the incident light-dependent lens unit.

The see-through type optical system may include: a transparent image forming device configured to form the first image; and a polarizer facing the incident light-dependent lens unit with the transparent image forming device interposed between the polarizer and the incident light-dependent lens unit, wherein the second image may be transmitted through the transparent image forming device to the ocular organ of the user.

The see-through type optical system may further include a quarter-wave plate (QWP) provided between the transparent image forming device and the incident light-dependent lens unit.

The see-through type display apparatus may have an angle of view greater than or equal to about 40°.

The see-through type display apparatus may be configured to implement augmented reality (AR) or mixed reality (MR).

The see-through type display apparatus may be a head mounted display (HMD).

The see-through type display apparatus may be a glasses-type display or a goggle-type display.

According to an aspect of another example embodiment, there is provided a see-through type display apparatus including: a see-through type optical system configured to transmit a first image by a first-path light, which is light traveling on a first path, to an ocular organ of a user, and a second image by a second-path light, which is light traveling on a second path, to the ocular organ of the user; and an incident light-dependent lens unit provided between the see-through type optical system and the ocular organ of the user and having different characteristics according to polarization directions of incident light, wherein the incident light-dependent lens unit includes: a first lens having a focal length varying according to the polarization directions of the incident light; and a second lens joined to the first lens and having a constant focal length regardless of the polarization directions of the incident light.

The incident light-dependent lens unit may function as a convex lens with respect to the first-path light and function as a flat plate with respect to the second-path light.

The first lens may have a positive first focal length with respect to the first-path light when the first-path light is incident on the first lens and has a first polarization direction and may have a negative second focal length with respect to the second-path light when the second-path light is incident on the first lens and has a second polarization direction, and the second lens may have a positive third focal length with respect to the first-path light when the first-path light is incident on the second lens and has the first polarization direction and the second-path light when the second-path light is incident on the second lens and has the second polarization direction.

An absolute value of the first focal length and an absolute value of the second focal length may be equal to each other, and an absolute value of the second focal length and an absolute value of the third focal length may be equal to each other.

According to an aspect of another example embodiment, there is provided a compound lens unit including: a first lens having a focal length varying according to polarization directions of incident light; and a second lens joined to the first lens and having a constant focal length regardless of the polarization directions of the incident light.

The first lens may have a positive first focal length with respect to an incident light having a first polarization direction and may have a negative second focal length with respect to an incident light having a second polarization direction, and the second lens may have a positive third focal length with respect to the incident light having the first polarization direction and the incident light having the second polarization direction.

An absolute value of the first focal length and an absolute value of the second focal length may be equal to each other.

An absolute value of the second focal length and an absolute value of the third focal length may be equal to each other.

The first lens may be a flat plate type lens, and the second lens may be a convex lens.

The compound lens unit may function as a convex lens with respect to an incident light having a first polarization direction and may function as a flat plate with respect to an incident light having a second polarization direction orthogonal to the first polarization direction.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and/or other aspects will become apparent and more readily appreciated from the following description of example embodiments, taken in conjunction with the accompanying drawings in which.

DETAILED DESCRIPTION

Figure 1:
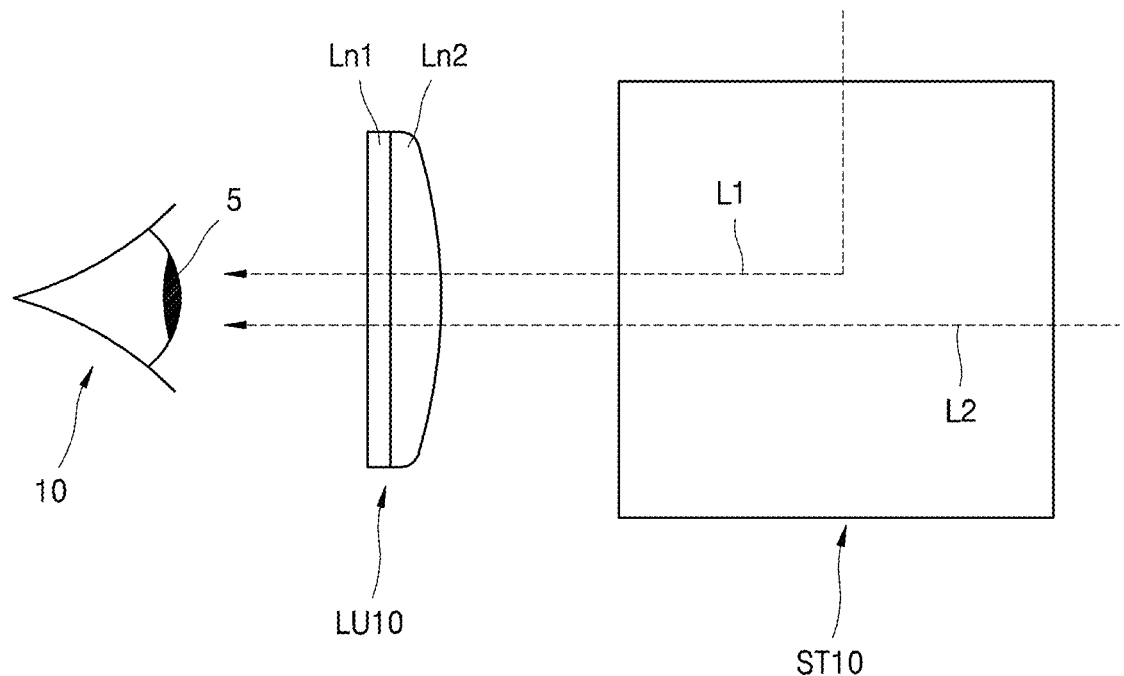
FIG. 1 schematically illustrates a see-through type display apparatus according to an example embodiment.

Reference will now be made in detail to example embodiments, examples of which are illustrated in the accompanying drawings. In this regard, the actual embodiments may have different forms and should not be construed as being limited to the example descriptions set forth herein. Accordingly, the embodiments described below by referring to the figures merely explain example aspects and do not limit the scope of this patent application. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as being limited to the particular shapes of regions illustrated herein, and instead may include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which the example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, lens units according to example embodiments, see-through type display apparatuses including the lens units, and electronic apparatuses including the same will be described in detail with reference to the accompanying drawings. The widths and thicknesses of layers or regions illustrated in the accompanying drawings may be exaggerated for clarity and convenience of description. Like reference numerals may denote like elements throughout the specification.

FIG. 1 schematically illustrates a see-through type display apparatus according to an example embodiment.

Referring to FIG. 1, the see-through type display apparatus may include a see-through type optical system ST10. The see-through type optical system ST10 may transmit a plurality of images via a plurality of paths to an ocular organ 10 of a user, that is, an eye having a pupil 5. For example, the see-through type optical system ST10 may transmit or guide a first image via a first-path light L1 and a second image via a second-path light L2 to the ocular organ 10. Any one of the first-path light L1 and the second-path light L2, for example, the second-path light L2, may be transmitted through the see-through type optical system ST10. In this case, the first-path light L1 may travel along a different path than the second-path light L2. For example, the first-path light L1 may be reflected by the see-through type optical system ST10. A detailed configuration of the see-through type optical system ST10 will be described later in detail with reference to FIGS. 11 to 18.

The see-through type display apparatus according to the present example embodiment may include a lens unit (also referred to as a lens portion) LU10 arranged between the see-through type optical system ST10 and the ocular organ 10 of the user. The lens unit LU10 may exhibit different refractive powers according to the characteristics of light incident thereon (e.g., incident light). For example, the lens unit LU10 may exhibit different refractive powers according to polarization directions of the incident light. Thus, the lens unit LU10 may be referred to as an incident light-dependent lens unit or a polarization-dependent lens unit. The lens unit LU10 may have a positive (+) first refractive power with respect to the first-path light L1 and may have a second refractive power different from the first refractive power with respect to the second-path light L2. The lens unit LU10 may have a refractive power equal to 0 or substantially equal to 0 with respect to the second-path light L2. Thus, the lens unit LU10 may function as a lens having a positive (+) refractive power with respect to the first-path light L1 and function as a flat plate (transparent medium) with respect to the second-path light L2. The flat plate may be an element different from a lens and may be a plate (e.g., transparent plate) that does not substantially converge or diverge the incident light. Herein, the first-path light L1 and the second-path light L2 may be incident on the lens unit LU10 while having different characteristics, for example, different polarization directions.

The lens unit LU10 may include a plurality of lenses Ln1 and Ln2. In this respect, the lens unit LU10 may be referred to as a compound lens unit. For example, the lens unit LU10 may include at least two lenses, a first lens Ln1 and a second lens Ln2. The second lens Ln2 may be provided adjacent to the first lens Ln1. For example, the second lens Ln2 may be joined to the first lens Ln1. In this case, the first lens Ln1 and the second lens Ln2 may be referred to as constituting a doublet lens, such as a cemented doublet lens (e.g., junction lens). As illustrated herein, the first lens Ln1 may be arranged nearer to the ocular organ 10 than the second lens Ln2, or vice versa. That is, the lens unit LU10 may be arranged in a position rotated by 180° with respect to a vertical center axis thereof. The first lens Ln1 may have a focal length varying according to the characteristics (e.g., polarization directions) of incident light. The second lens Ln2 may have a constant focal length regardless of the characteristics (e.g., polarization directions) of incident light. The respective features of the first lens Ln1, the second lens Ln2, and the lens unit LU10 corresponding to a combination thereof will be described later in detail with reference to FIGS. 3A to 5B.

The first image transmitted by the first-path light L1 may be an image formed and provided by the see-through type display apparatus. The first image may include virtual reality or virtual information as a display image. The second image transmitted by the second-path light L2 may be an outside image that the user faces through the see-through type display apparatus. The second image may include a foreground image that the user faces, and a certain background subject. The second image may be an image of the real world. Thus, the see-through type display apparatus according to the present example embodiment may be applied to generate augmented reality (AR) or mixed reality (MR).

Hereinafter, how the lens unit LU10 (the incident light-dependent lens unit) functions differently with respect to the first-path light L1 and the second-path light L2 will be described in more detail with reference to FIGS. 2A and 2B.

Figure 2A:
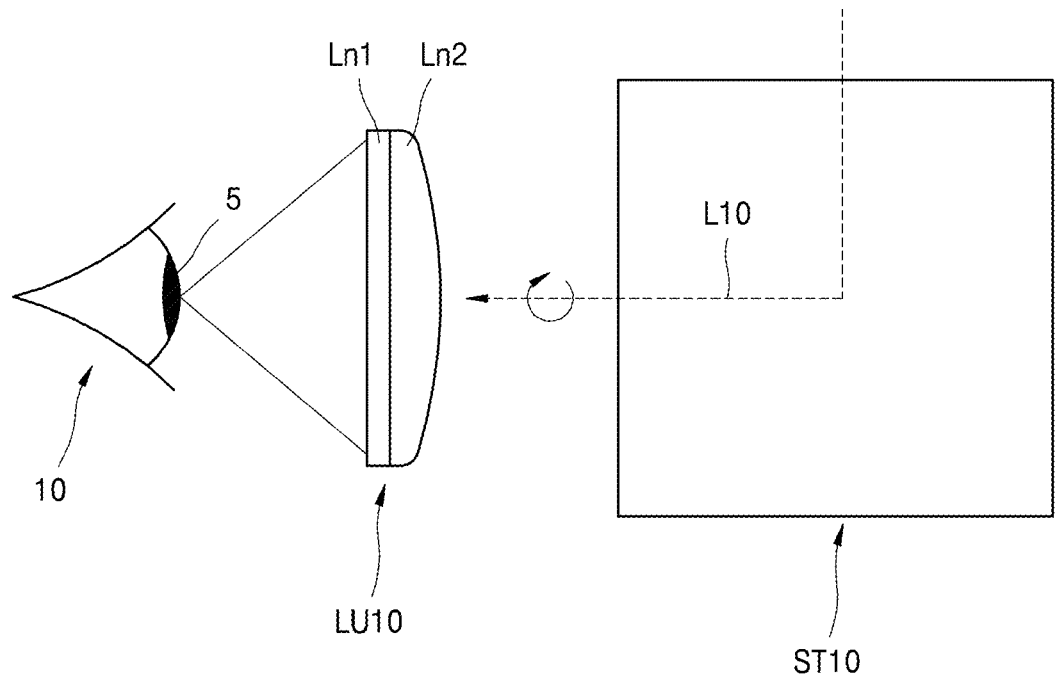
FIGS. 2A and 2B illustrate the principle and function of the see-through type display apparatus of FIG. 1.

As illustrated in FIG. 2A, a first-path light L10 may be incident on the lens unit LU10 while having a first polarization direction. For example, the first-path light L10 may be incident on the lens unit LU10 while being right-handed circularly polarized. In other words, the first polarization direction may be right-hand circular polarization (RHCP). The lens unit LU10 may function as a lens having a positive (+) refractive power with respect to the first-path light L10. The lens having a positive (+) refractive power may be referred to as a convex lens. The ocular organ 10 of the user may see a display image by the first-path light L10 through the lens unit LU10. In this case, since the lens LU10 is arranged near to the ocular organ 10, a focal length of the lens unit LU10 may be relatively small in comparison with a diameter of the lens unit LU10. Consequently, a wide viewing angle (or angle of view or field of view) may be easily secured.

Figure 2B:
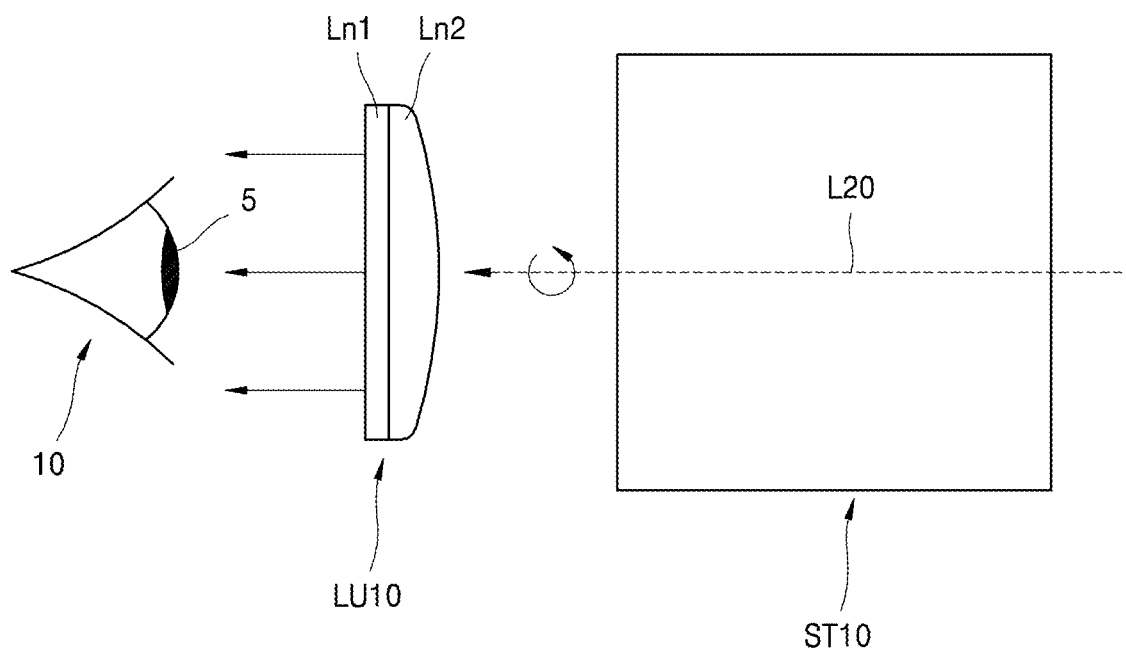

As illustrated in FIG. 2B, a second-path light L20 may be incident on the lens unit LU10 while having a second polarization direction. The second polarization direction may be orthogonal to the first polarization direction. For example, the second-path light L20 may be incident on the lens unit LU10 while being left-handed circularly polarized. In other words, the second polarization direction may be left-hand circular polarization (LHCP). The lens unit LU10 may have a refractive power of 0 or substantially 0 with respect to the second-path light L20. In other words, the lens unit LU10 may function as a flat plate. In this manner, in the case of seeing a second image by the second-path light L20, since the lens unit LU10 may function as a flat plate, the second image may be prevented from being distorted by the lens unit LU10. Thus, the user may see the second image without distortion.

When the first image is a virtual display image and the second image is an image of the real world (image received from the outside), the lens unit LU10 may function as a lens having a positive refractive power with respect to the display image to increase a viewing angle thereof and may function as a flat plate with respect to the outside image to prevent an image distortion problem thereof. In this manner, the above-described effects may be simultaneously obtained due to the incident light-dependent characteristics of the lens unit LU10.

For a general see-through type display apparatus, in order to see the outside image in a see-through manner without distortion, a lens may not be arranged in front of a user's eye. In other words, a lens distorting the outside image may not be arranged between the user's eye and the outside foreground. Thus, a lens to see a virtual display image may need to be arranged by avoiding an area between the user's eye and the outside foreground (also referred to as an avoidance arrangement). In this case, however, since an optical path between the user's eye and the lens may become long, a viewing angle thereof may decrease. For example, when the lens is arranged in a conventional manner, the viewing angle may be as narrow as about 20°.

However, according to the present example embodiment, since the incident light-dependent lens unit LU10 is arranged between the ocular organ 10 and the see-through type optical system ST10, the lens unit LU10 may function as a lens (e.g., convex lens) with respect to the display image and as a flat plate (transparent medium) with respect to the outside image. Thus, since the optical path between the ocular organ 10 and the lens unit LU10 may be shortened, a wide viewing angle may be easily secured. In addition, the outside image may be seen without distortion because the lens unit LU10 may function as a flat plate. The see-through type display apparatus may have a viewing angle of about 40° or more or about 60° or more. The viewing angle may be about 100° or more.

Figure 3A:
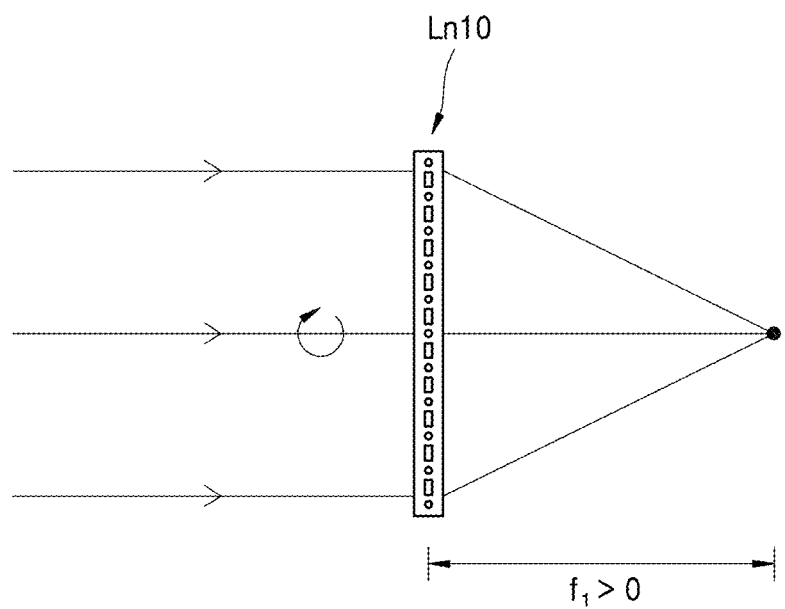
FIGS. 3A and 3B illustrate the features of a first lens applicable to a lens unit of a see-through type display apparatus according to an example embodiment.
Figure 3B:
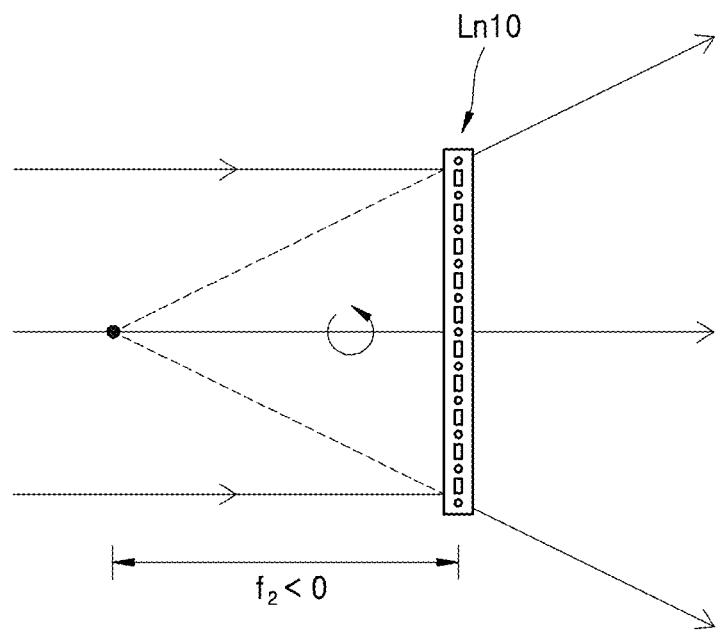
Figure 4:
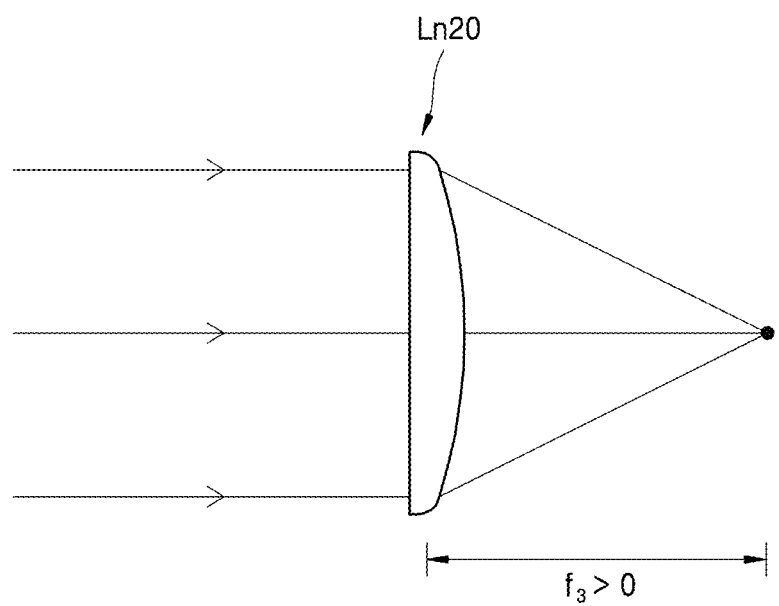
FIG. 4 illustrates the features of a second lens applicable to a lens unit of a see-through type display apparatus according to an example embodiment.
Figure 5A:
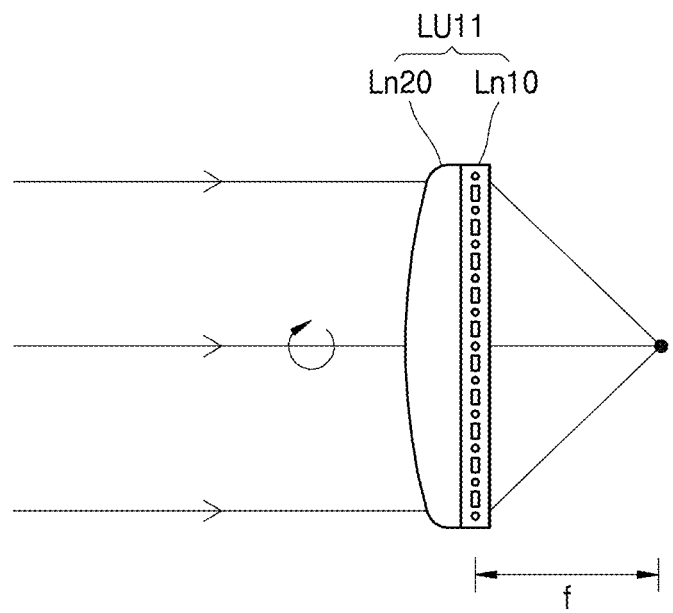
FIGS. 5A and 5B illustrate the features of a compound lens unit corresponding to a combination of a first lens and a second lens applicable to a see-through type display apparatus according to an example embodiment.
Figure 5B:
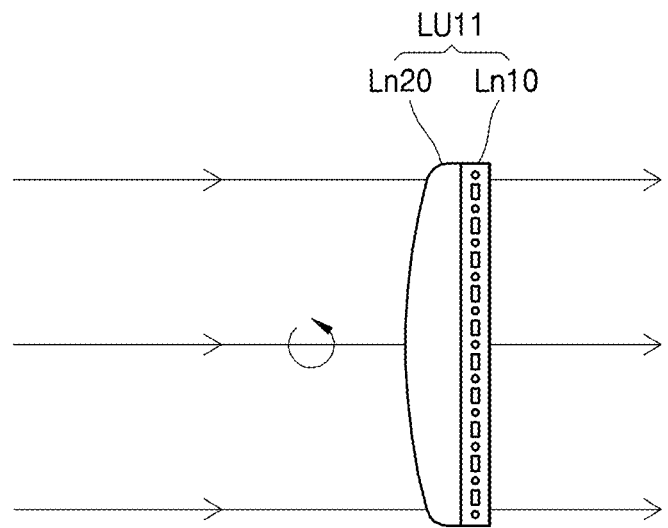

Hereinafter, the respective features of the first lens Ln1, the second lens Ln2, and the lens unit LU10 corresponding to a combination thereof illustrated in FIG. 1 will be described in detail with reference to FIGS. 3A, 3B, 4, 5A, and 5B. FIGS. 3A and 3B illustrate the features of the first lens Ln1, FIG. 4 illustrates the features of the second lens Ln2, and FIGS. 5A and 5B illustrate the features of the lens unit LU10.

FIGS. 3A and 3B illustrate the features of a first lens Ln10 applicable to a lens unit of a see-through type display apparatus according to an example embodiment.

Referring to FIG. 3A, the first lens Ln10 may have a positive (+) focal length $f_1$ with respect to an incident light having a first polarization direction. The focal length $f_1$ will be referred to as a first focal length $f_1$. Thus, the first lens Ln10 may function as a lens (e.g., convex lens) having a positive (+) refractive power with respect to the incident light having the first polarization direction. The first polarization direction may be, for example, right-hand circular polarization (RHCP).

Referring to FIG. 3B, the first lens Ln10 may have a negative (−) focal length $f_2$ with respect to an incident light having a second polarization direction. The focal length $f_2$ will be referred to as a second focal length $f_2$. Thus, the first lens Ln10 may function as a lens (e.g., concave lens) having a negative (−) refractive power with respect to the incident light having the second polarization direction. The second polarization direction may be orthogonal to the first polarization direction. For example, the second polarization direction may be left-hand circular polarization (LHCP). Herein, the absolute value of the second focal length $f_2$ may be equal or substantially equal to the absolute value of the first focal length $f_1$. Thus, the first lens Ln10 may have focal lengths of the same size but opposite signs with respect to the incident light having the first polarization direction and the incident light having the second polarization direction.

The first lens Ln10 described with reference to FIGS. 3A and 3B may include, for example, a plurality of nonlinear material elements forming a certain pattern. By the pattern of the plurality of nonlinear material elements, the first lens Ln10 may exhibit features illustrated in FIGS. 3A and 3B. Herein, the plurality of nonlinear material elements may include, for example, liquid crystal polymers or the like. The plurality of nonlinear material elements will be described later in more detail with reference to FIG. 6.

FIG. 4 illustrates the features of a second lens Ln20 applicable to a lens unit of a see-through type display apparatus according to an example embodiment.

Referring to FIG. 4, the second lens Ln20 may have a constant focal length $f_3$ regardless of the polarization directions of incident beams of light. In this respect, the second lens Ln20 may be referred to as an isotropic lens. Thus, the second lens Ln20 may have an equal (or substantially equal) focal length $f_3$ with respect to the incident light having the first polarization direction of FIG. 3A and the incident light having the second polarization direction of FIG. 3B. The focal length $f_3$ will be referred to as a third focal length $f_3$. The third focal length $f_3$ may have a positive (+) value. Thus, the second lens Ln20 may be a lens (e.g., convex lens) having a positive (+) refractive power. The absolute value of the third focal length $f_3$ may be equal or substantially equal to the absolute value of the second focal length $f_2$ of FIG. 3B. Also, the third focal length $f_3$ may be equal or substantially equal to the first focal length $f_1$ of FIG. 3A.

FIGS. 5A and 5B illustrate the features of a compound lens unit LU11 corresponding to a combination of a first lens Ln10 and a second lens Ln20 applicable to a see-through type display apparatus according to an example embodiment. Herein, the first lens Ln10 corresponds to the first lens Ln10 of FIGS. 3A and 3B, and the second lens Ln20 corresponds to the second lens Ln20 of FIG. 4.

Referring to FIG. 5A, a lens unit LU11 corresponding to a combination of a first lens Ln10 and a second lens Ln20 may have a positive (+) focal length f with respect to an incident light having a first polarization direction. The incident light having the first polarization direction may be the same as the incident light having the first polarization direction described with reference to FIG. 3A. For example, the first polarization direction may be right-hand circular polarization (RHCP). The focal length f of the lens unit LU11 may be smaller than the first focal length $f_1$ of FIG. 3A and may be smaller than the third focal length $f_3$ of FIG. 4. For example, the focal length f may correspond to the half (½) of the first focal length $f_1$ of FIG. 3A. Also, the focal length f may correspond to the half (½) of the third focal length $f_3$ of FIG. 4. The first lens Ln10 may have a positive (+) first refractive power with respect to the incident light having the first polarization direction, and the second lens Ln20 may have a positive (+) second refractive power with respect to the incident light having the first polarization direction. Thus, the lens unit LU11 corresponding to the combination of the first lens Ln10 and the second lens Ln20 may have a third refractive power corresponding to the sum of the first refractive power and the second refractive power. The first refractive power and the second refractive power may be equal or substantially equal to each other, and in this case, the lens unit LU11 may have a refractive power (the third refractive power) corresponding to two times the first refractive power. Therefore, the lens unit LU11 may have the focal length f corresponding to the half (½) of the first focal length $f_1$ (see FIG. 3A), which may also be referred to as corresponding to the half (½) of the third focal length $f_3$ (see FIG. 4).

As illustrated in FIG. 5A, since the lens unit LU11 may have a great refractive power (a small focal length) corresponding to two times the refractive power of the first lens Ln10 or the second lens Ln20 with respect to an incident light having the first polarization direction, the lens unit LU11 may have an excellent viewing angle increasing effect with respect to the incident light. When a general liquid crystal lens and an isotropic lens are combined together, since a refractive index difference between the two lenses may not be great, a large viewing angle may not be easily secured. However, as in the example embodiment, in the case of using the first lens Ln10 having a focal length varying according to the polarization directions of incident light and the second lens Ln20 having a constant focal length, since a great refractive power (a small focal length) may be easily obtained, the F-number of the lens unit LU11 may be reduced and the viewing angle may be easily increased. In this regard, the viewing angle of the see-through type display apparatus illustrated in FIG. 1 may be about 40° or more, about 60° or more, or about 100° or more. In addition, when the lens unit LU11 illustrated in FIG. 5A is applied to the see-through type display apparatus illustrated in FIG. 1, since the distance between the ocular organ 10 and the lens unit LU11 may be, for example, about 10 mm to about 40 mm, the focal length f of the lens unit LU11 may be about 10 mm to about 40 mm. However, this is merely an example of the focal length f, and the focal length f of the lens unit LU11 may be about 10 mm or less or about 40 mm or more.

Referring to FIG. 5B, the lens unit LU11 may have an infinite (∞) or substantially infinite (∞) focal length with respect to an incident light having a second polarization direction. In other words, the lens unit LU11 may have a refractive power of 0 or substantially 0 with respect to the incident light having the second polarization direction. The incident light having the second polarization direction may be the same as the incident light having the second polarization direction described with reference to FIG. 3B. The second polarization direction may be orthogonal to the first polarization direction. For example, the second polarization direction may be left-hand circular polarization (LHCP). Since the first lens Ln10 may have a negative (−) refractive power with respect to the incident light having the second polarization direction (see FIG. 3B), the second lens Ln20 may have a positive (+) refractive power (see FIG. 4), and the absolute value of the negative (−) refractive power and the absolute value of the positive (+) refractive power may be equal to each other, the lens unit LU11 corresponding to a combination thereof may have a refractive power of 0 or substantially 0 with respect to the incident light having the second polarization direction. Thus, the lens unit LU11 may have an infinite (∞) or substantially infinite (∞) focal length with respect to the incident light having the second polarization direction. In other words, the lens unit LU11 may function as a flat plate (e.g., a flat transparent medium) with respect to the incident light having the second polarization direction.

Table 1 below summarizes the features of the first lens Ln10, the second lens Ln20, and the lens unit LU11 corresponding to a combination thereof with respect to an incident light having a first polarization direction and an incident light having a second polarization direction. The first polarization direction and the second polarization direction may be orthogonal to each other.

TABLE 1

| | Incident Light Having First Polarization Direction | Incident Light Having Second Polarization Direction |
|---|---|---|
| First Lens (Ln10) | $f_1 > 0$ | $f_2 < 0$ |
| Second Lens (Ln20) | $f_3 > 0$ | $f_3 > 0$ |
| Compound Lens Unit (LU11) | $f > 0$ (e.g., $f = f_1/2$) | Flat Plate (Transparent) |

The features described with reference to FIGS. 3A to 5B are summarized in Table 1 above. The lens unit LU11 may function as a lens having a positive (+) focal length f with respect to the incident light having the first polarization direction and may function as a flat plate (e.g., a transparent piece of glass or plastic) with respect to the incident light having the second polarization direction. However, the features summarized in Table 1 are merely examples and may vary according to numerous factors, such as design considerations, materials, etc.

Figure 6:
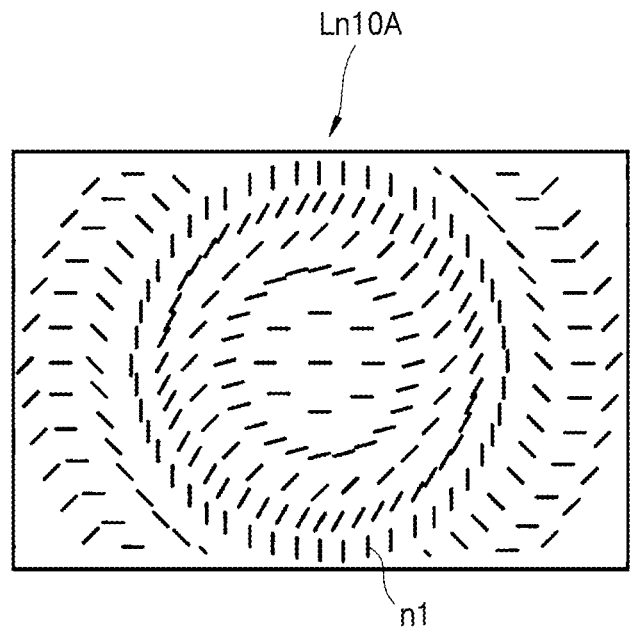
FIG. 6 is a plan view illustrating an example of the configuration of a first lens applicable to a lens unit of a see-through type display apparatus according to an example embodiment.

FIG. 6 is a plan view illustrating an example of the configuration of a first lens Ln10A applicable to a lens unit of a see-through type display apparatus according to an example embodiment.

Referring to FIG. 6, the first lens Ln10A may include a plurality of nonlinear material elements n1 forming a certain pattern. The plurality of nonlinear material elements n1 may include, for example, liquid crystal polymers. However, this is merely an example, and the materials of the nonlinear material elements n1 may vary in various ways. The plurality of nonlinear material elements n1 may form a planar (two-dimensional) pattern and may also form a pattern in a thickness direction of the first lens Ln10A in some cases. By a pattern array of the nonlinear material elements n1, the first lens Ln10A may exhibit different characteristics according to the polarization directions of incident light. For example, the first lens Ln10A may have a positive (+) first focal length with respect to an incident light having a first polarization direction and may have a negative (−) second focal length with respect to an incident light having a second polarization direction. In this case, the absolute value of the first focal length and the absolute value of the second focal length may be equal or substantially equal to each other.

The first lens Ln10A may have a length and a width of, for example, several mm to tens of mm and may have a small thickness of several mm or less. As an example, the thickness of the first lens Ln10A may be smaller than about 1 mm. Also, the first lens Ln10A may have a flat structure and may generate no spherical aberration when operating as a single lens. Additionally, the first lens Ln10A may have flexible characteristics. The focal length (+f) of the first lens Ln10A may be several mm to hundreds of mm, although is not limited thereto. For example, the focal length (+f) of the first lens Ln10A may be about 10 mm to about 100 mm. However, the sizes and features of the first lens Ln10A described herein are merely examples and may vary according to example embodiments.

Although FIGS. 5A and 5B illustrate a case where a plano-convex lens is used as the second lens Ln20, a bi-convex lens may also be used as the second lens Ln20 according to another example embodiment. This configuration will be described below with reference to FIG. 7.

Figure 7:
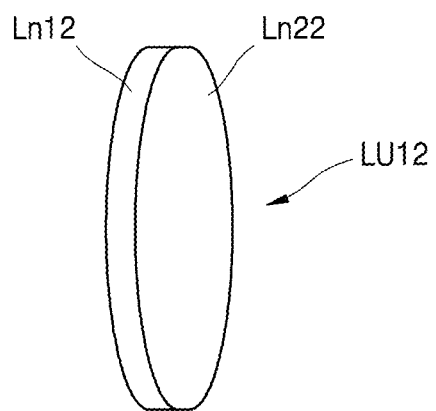
FIG. 7 is a cross-sectional view illustrating the configuration of a lens unit applicable to a see-through type display apparatus according to another example embodiment.

FIG. 7 is a cross-sectional view illustrating the configuration of a lens unit LU12 applicable to a see-through type display apparatus according to another example embodiment.

Referring to FIG. 7, the lens unit LU12 according to the present example embodiment may include a first lens Ln12 and a second lens Ln22. The second lens Ln22 may be a lens having an incident surface and an exit surface that are both convex. In other words, the second lens Ln22 may be a bi-convex lens. The first lens Ln12 may be joined to one surface (the incident surface or the exit surface) of the second lens Ln22. The first lens Ln12 may have a configuration and features identical or similar to those of the first lenses Ln10 and Ln10A described with reference to FIGS. 3A, 3B, and 6, and may be attached (or joined) to a curved surface (the incident surface or the exit surface) of the second lens Ln22. Thus, both surfaces (the incident surface or the exit surface) of the first lens Ln12 may have a curvature similar to the attached surface of the second lens Ln22. Also in this case, the first lens Ln12 may exhibit the same features as described with reference to FIGS. 3A, 3B, and 6. The effect of the curvature may be compensated by properly adjusting the pattern of a plurality of nonlinear material elements included in the first lens Ln12. Also, when there is an aberration of the lens unit LU12, a separate element and/or algorithm may be introduced to compensate or correct the aberration. This may also be true for the lens unit LU11 described with reference to FIGS. 5A and 5B.

The respective features of the first lens Ln12, the second lens Ln22, and the lens unit LU12 corresponding to a combination thereof illustrated in FIG. 7 may be the same as those of the first lens Ln10, the second lens Ln20, and the lens unit LU11 illustrated in Table 1.

Although FIGS. 5A, 5B, and 7 illustrate a case where two lenses (Ln10 & Ln20 or Ln12 & Ln22) are used to construct a lens unit (LU11 or LU12), three or more lenses may also be used to construct a lens unit. An example thereof is illustrated in FIG. 8.

Figure 8:
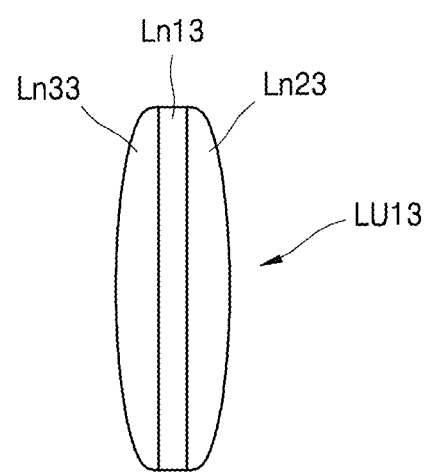
FIG. 8 is a cross-sectional view illustrating the configuration of a lens unit applicable to a see-through type display apparatus according to another example embodiment.

FIG. 8 is a cross-sectional view illustrating the configuration of a lens unit LU13 applicable to a see-through type display apparatus according to another example embodiment.

Referring to FIG. 8, the lens unit LU13 may include a first lens Ln13 and a second lens Ln23 joined to one surface of the first lens Ln13. Also, the lens unit LU13 may further include a third lens Ln33 joined to the other surface of the first lens Ln13. The first lens Ln13 may have a configuration and features identical or similar to those of the first lens Ln10 described with reference to FIGS. 3A, 3B, and 6. Thus, the first lens Ln13 may have different focal lengths according to the polarization directions of incident light. Also, the second lens Ln23 may have a configuration and features similar to those of the second lens Ln20 described with reference to FIG. 4. Thus, the second lens Ln23 may have a constant focal length regardless of the polarization directions of incident light. Also, the third lens Ln33 may have a configuration and features similar to those of the second lens Ln20 described with reference to FIG. 4. Thus, the third lens Ln33 may have a constant focal length regardless of the polarization directions of incident light. The second lens Ln23 may be a plano-convex lens, and the third lens Ln33 may also be a plano-convex lens.

In the example embodiment of FIG. 8, the sum of the effect of the second lens Ln23 and the effect of the third lens Ln33 may correspond to the effect of the second lens Ln20 of FIGS. 5A and 5B. In other words, the effect of the second lens Ln20 of FIGS. 5A and 5B may be distributed to construct the second lens Ln23 and the third lens Ln33 of FIG. 8. Thus, the sum of the refractive power of the second lens Ln23 and the refractive power of the third lens Ln33 illustrated in FIG. 8 may correspond to the refractive power of the second lens Ln20 of FIGS. 5A and 5B. Thus, the features of the lens unit LU13 of FIG. 8 may be identical or similar to the features of the lens unit LU11 of FIGS. 5A and 5B.

According to example embodiments, at least one first lens and at least one second lens may be combined to construct a lens unit. Herein, the first lens may be a polarization-dependent lens (e.g., Ln10 of FIGS. 3A and 3B) that has a focal length varying according to the polarization directions of incident light. The second lens may be a lens (e.g., Ln20 of FIG. 4) that has a constant focal length regardless of the polarization directions of incident light. A first lens and a second lens, or a first lens and a plurality of second lenses, or a plurality of first lenses and at least one second lens may be combined to construct a lens unit. In some cases, a plurality of first lenses and a plurality of second lenses may be combined to construct a lens unit. In the case of using a plurality of second lenses, at least one of the plurality of second lenses may be a lens (e.g., convex lens) that has a positive (+) refractive power. In this case, at least one other of the plurality of second lenses may be a lens (e.g., concave lens) that has a negative (−) refractive power. Also, a lens unit (an incident light-dependent lens unit) may be implemented in various other combinations and manners. In the above description of the second lens, the terms "convex lens" and "concave lens" are named according to the signs of refractive powers and the convex lens and the concave lens may be spherical lenses or aspherical lenses.

Figure 9:
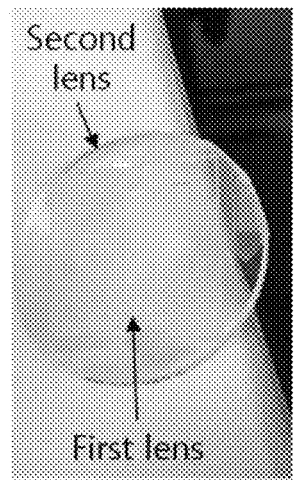
FIG. 9 is a picture illustrating an example of a lens unit applicable to a see-through type display apparatus according to an example embodiment.

FIG. 9 is a picture illustrating an example of a lens unit applicable to a see-through type display apparatus according to an example embodiment.

Referring to FIG. 9, the lens unit may be a compound lens corresponding to a combination of a plurality of lenses. The lens unit may include a first lens and a second lens joined thereto. The first lens may correspond to the first lens (Ln1, Ln10, Ln10A, or Ln12) described with reference to FIG. 1 or the like. The second lens may correspond to the second lens (Ln2, Ln20, or Ln22) described with reference to FIG. 1 or the like. Thus, the first lens may be a lens having a focal length varying according to the polarization directions of incident light, and the second lens may be a lens having a constant focal length regardless of the polarization directions of incident light. The thickness of a lens unit corresponding to a combination of the first lens and the second lens may be about 10 mm or less, and the diameter of the lens unit may be about 1 inch. The lens unit (e.g., compound lens unit) of FIG. 9 is made as an example for basic experiments.

Figure 10:
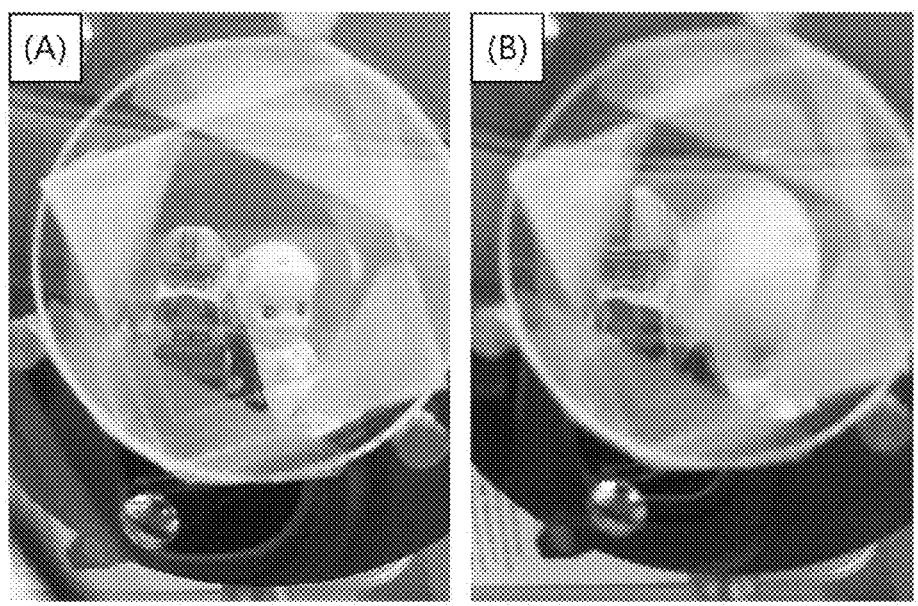
FIG. 10 is a picture illustrating basic experimental results for evaluating the characteristics of the lens unit of FIG. 9.

FIG. 10 is a picture illustrating basic experimental results for evaluating the characteristics of the lens unit of FIG. 9.

In FIG. 10, (A) corresponds to a case where the lens unit functions in a flat plate (e.g., transparent flat plate) mode, and (B) corresponds to a case where the lens unit functions in a lens (e.g., convex lens) mode. (A) corresponds to a case where a left-handed circularly polarized incident light is used, and (B) corresponds to a case where a right-handed circularly polarized incident light is used. The lens unit features of (A) may correspond to FIG. 5B, and the lens unit features of (B) may correspond to FIG. 5A. As shown in picture (A), since the lens unit functions as a flat plate, a subject may be seen in its original (or nearly original) size. As shown in picture (B), since the lens unit functions as a convex lens, a subject may be seen in a magnified form. From these results, it may be seen that the lens unit according to an example embodiment may function in a flat plate mode or a lens mode according to the characteristics (e.g., polarization characteristics) of incident light.

Figure 11:
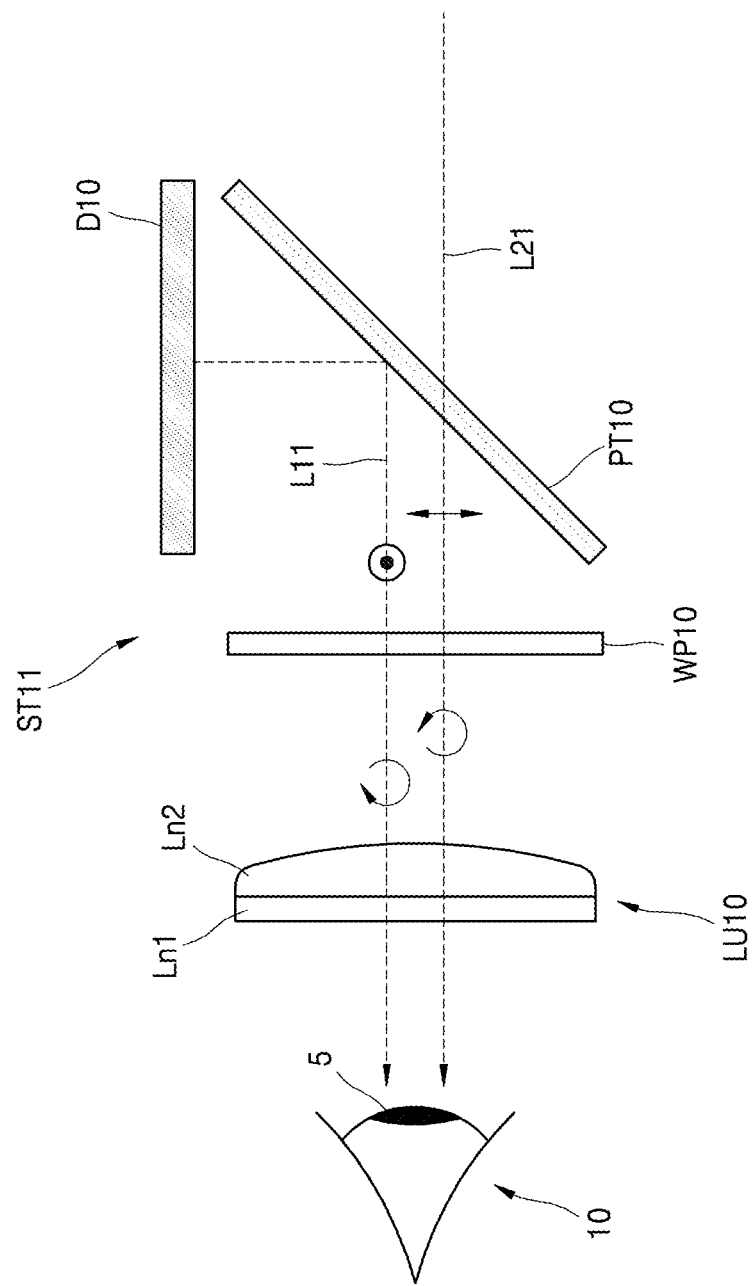
FIG. 11 illustrates an example of the configuration of a see-through type display apparatus according to an example embodiment.

FIG. 11 illustrates an example of the configuration of a see-through type display apparatus according to an example embodiment.

Referring to FIG. 11, the see-through type display apparatus may include a see-through type optical system ST11. The see-through type optical system ST11 may transmit or guide a first image by a first-path light L11 and a second image by a second-path light L21 to an ocular organ 10 of a user. The see-through type display apparatus may further include a lens unit LU10 arranged between the see-through type optical system ST11 and the ocular organ 10. The lens unit LU10 may have the same configuration and features as described with reference to FIGS. 2A to 10.

An example of the configuration of the see-through type optical system ST11 will be described below. The see-through type optical system ST11 may include an image forming device D10 configured to form the first image. Also, the see-through type optical system ST11 may include a polarization beam splitter PT10 configured to transmit the first image formed by the image forming device D10 to the ocular organ 10 of the user.

The image forming device D10 may include, for example, a spatial light modulator (SLM). The SLM may be a transmissive light modulator, a reflective light modulator, or a transflective light modulator. As an example, the SLM may include a liquid crystal on silicon (LCoS) panel, a liquid crystal display (LCD) panel, or a digital light projection (DLP) panel. Herein, the DLP panel may include a digital micromirror device (DMD). FIG. 11 illustrates a case where the image forming device D10 includes a transmissive light modulator. A light source unit configured to radiate light onto the image forming device D10 may be further provided. The image forming device D10 may be arranged between the light source unit and the see-through type optical system ST11. In some cases, the image forming device D10 may include a light emitting diode (LED) display device or an organic LED (OLED) display device. The image forming device D10 may be used to implement a two-dimensional (2D) image or a three-dimensional (3D) image. Herein, the 3D image may be a holographic image, a stereo image, a light field image, or an integral photography (IP) image. The image forming device D10 may be referred to as a display device or a micro-display device, and a configuration of the image forming device D10 is not limited to the above description and may vary in various ways.

The polarization beam splitter PT10 may transmit the first image formed by the image forming device D10 to the ocular organ 10 of the user. The first image may be reflected by the polarization beam splitter PT10 and then transmitted to the ocular organ 10. The second image may be transmitted through the polarization beam splitter PT10 and then transmitted to the ocular organ 10. Thus, the polarization beam splitter PT10 may be a transflective member. The polarization beam splitter PT10 may be a transflective member having a polarization function. The polarization beam splitter PT10 may reflect a light having a (1-1)th polarization direction and transmit a light having a (2-1)th polarization direction. Thus, by using the polarization beam splitter PT10, a first-path light L11 may travel while being polarized (linearly polarized) in a (1-1)th direction, for example, a direction perpendicular to a surface of the drawing sheet, and a second-path light L21 may travel while being polarized (linearly polarized) in a (2-1)th direction, for example, a direction orthogonal to the (1-1)th direction. For example, the (1-1)th polarization direction may be a horizontal direction on the drawing, and the (2-1)th polarization direction may be a vertical direction on the drawing.

The see-through type optical system ST11 may further include a wave plate WP10 arranged between the polarization beam splitter PT10 and the lens unit LU10. The wave plate WP10 may be, for example, a quarter-wave plate (QWP). By using the wave plate WP10, the first-path light L11 may be incident on the lens unit LU10 while being polarized (circularly polarized) in a (1-2)th direction, and the second-path light L21 may be incident on the lens unit LU10 while being polarized (circularly polarized) in a (2-2)th direction. The (1-2)th direction and the (2-2)th direction may be orthogonal to each other. For example, by using the wave plate WP10, the first-path light L11 may be incident on the lens unit LU10 while being right-handed circularly polarized, and the second-path light L21 may be incident on the lens unit LU10 while being left-handed circularly polarized. The lens unit LU10 may function as a lens having a positive (+) refractive power with respect to the first-path light L11 and may function as a flat plate having a refractive power of 0 or substantially 0 with respect to the second-path light L21.

Figure 12:
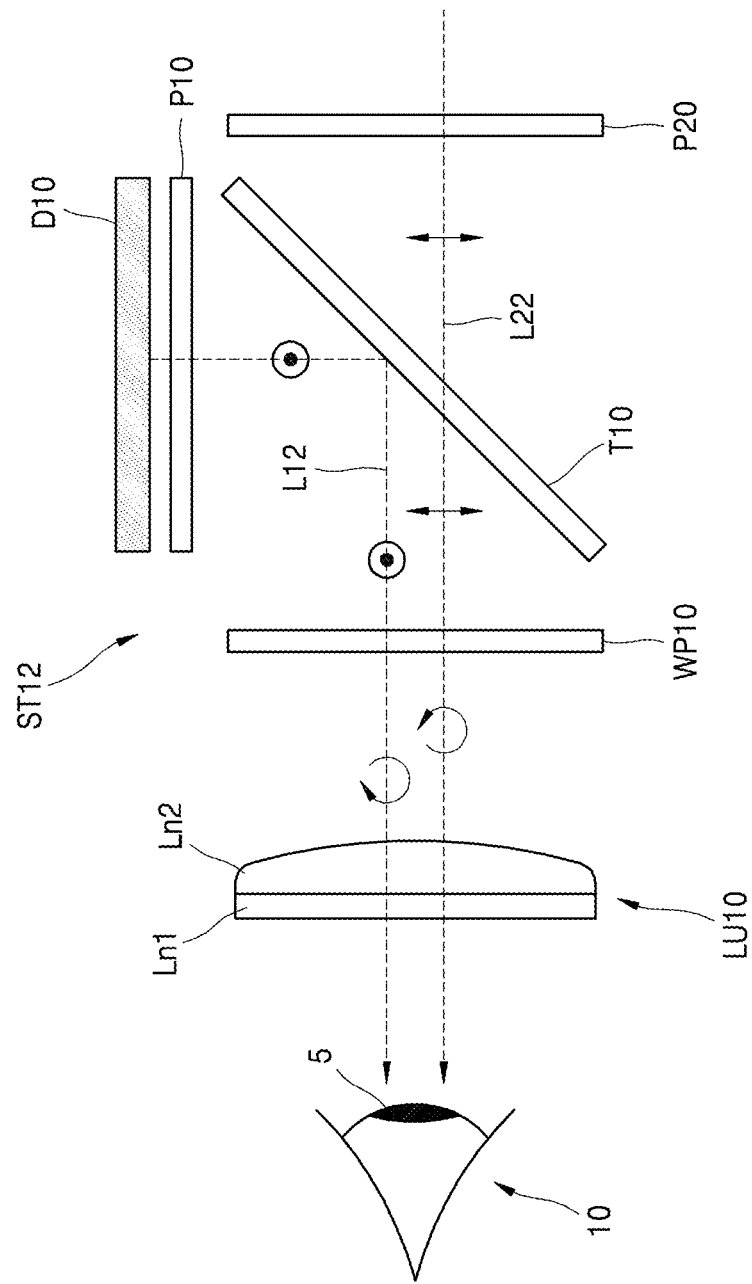
FIG. 12 illustrates an example of the configuration of a see-through type display apparatus according to another example embodiment.

FIG. 12 illustrates an example of the configuration of a see-through type display apparatus according to another example embodiment.

Referring to FIG. 12, a see-through type optical system ST12 of the see-through type display apparatus may include an image forming device D10 configured to form a first image and a transflective member T10 configured to transmit the first image formed by the image forming device D10 to an ocular organ 10 of a user. The transflective member T10 may not have a self-polarization function. The transflective member T10 may be, for example, a beam splitter or a transflective film. In this case, the see-through type optical system ST12 may further include a first polarizer P10 provided between the transflective member T10 and the image forming device D10, and a second polarizer P20 provided to face a lens unit LU10 with the transflective member T10 interposed therebetween. Also, the see-through type optical system ST12 may further include a wave plate WP10 as described with reference to FIG. 11. The wave plate WP10 may be, for example, a quarter-wave plate (QWP).

A first-path light L12 may be polarized (linearly polarized) by the first polarizer P10 in a (1-1)th direction, reflected by the transflective member T10, polarized (circularly polarized) by the wave plate WP10 in a (1-2)th direction, and then incident on the lens unit LU10. A second-path light L22 may be polarized (linearly polarized) by the second polarizer P20 in a (2-1)th direction, for example, a direction orthogonal to the (1-1)th direction, transmitted through the transflective member T10, polarized (circularly polarized) by the wave plate WP10 in a (2-2)th direction, and then incident on the lens unit LU10. The (1-2)th direction and the (2-2)th direction may be orthogonal to each other. The lens unit LU10 may function as a lens having a positive (+) refractive power with respect to the first-path light L12 and may function as a flat plate having a refractive power of 0 or substantially 0 with respect to the second-path light L22. A first image (display image) by the first-path light L12 may be reflected by the transflective member T10 and then transmitted to the ocular organ 10, and a second image (outside image) by the second-path light L22 may be transmitted through the transflective member T10 and then transmitted to the ocular organ 10.

Figure 13:
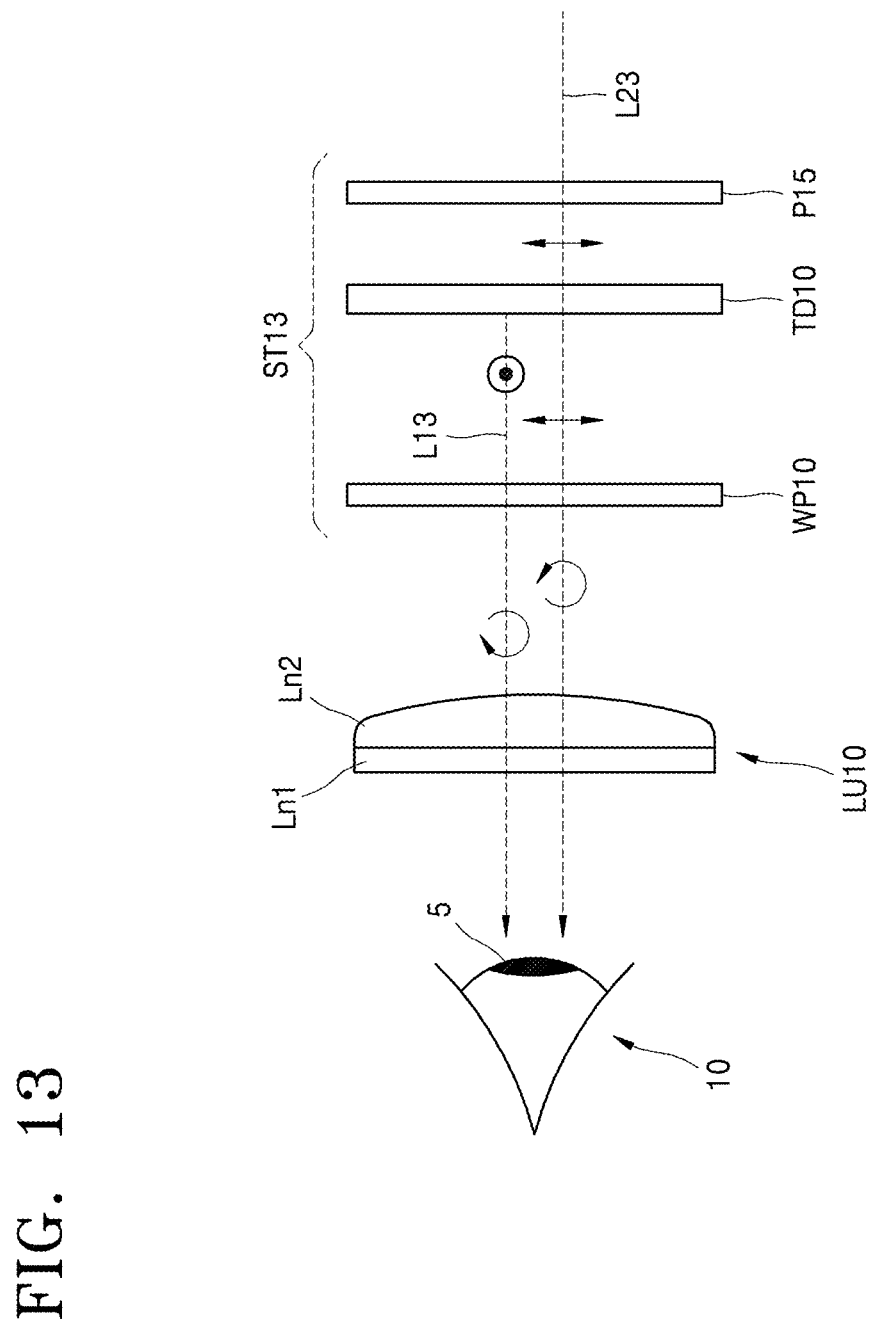
FIG. 13 illustrates an example of the configuration of a see-through type display apparatus according to another example embodiment.

FIG. 13 illustrates an example of the configuration of a see-through type display apparatus according to another example embodiment.

Referring to FIG. 13, a see-through type optical system ST13 of the see-through type display apparatus may include a transparent image forming device TD10 configured to form a first image. The transparent image forming device TD10 may form an image and transmit light. In this case, the transparent image forming device TD10 may be arranged between an ocular organ 10 of a user and an outside foreground that the user faces. The transparent image forming device TD10 may include, for example, a light emitting diode (LED) display device or an organic LED (OLED) display device. The transparent image forming device TD10 may be a self-luminous device. Also, the transparent image forming device TD10 may be configured to emit light polarized in a particular direction. For this purpose, the transparent image forming device TD10 may include a polarization layer or a polarization element.

The see-through type optical system ST13 may further include a polarizer P15 provided to face the lens unit LU10 with the transparent image forming device TD10 interposed therebetween. The polarizer P15 may be referred to as being arranged between the transparent image forming device TD10 and the outside foreground. Also, the see-through type optical system ST13 may further include a wave plate WP10 as described with reference to FIG. 11. The wave plate WP10 may be, for example, a quarter-wave plate (QWP).

A light L13 generated by the transparent image forming device TD10 may be referred to as a first-path light, and a light L23 entering from outside the see-through type optical system ST13 to be transmitted through the see-through type optical system ST13 may be referred to as a second-path light. Since the first-path light L13 and the second-path light L23 are similar in their traveling directions but different in their generation positions and overall paths, they may be referred to as having different paths.

The first-path light L13 may be polarized (linearly polarized) by the transparent image forming device TD10 in a (1-1)th direction and then polarized (circularly polarized) by the wave plate WP10 in a (1-2)th direction. The second-path light L23 may be polarized (linearly polarized) by the polarizer P15 in a (2-1)th direction different from the (1-1)th direction, transmitted through the transparent image forming device TD10, and then polarized (circularly polarized) by the wave plate WP10 in a (2-2)th direction. The (1-1)th direction and the (2-1)th direction may be orthogonal to each other, and the (1-2)th direction and the (2-2)th direction may be orthogonal to each other. The lens unit LU10 may function as a lens having a positive (+) refractive power with respect to the first-path light L13 and may function as a flat plate having a refractive power of 0 or substantially 0 with respect to the second-path light L23. Thus, a wide viewing angle may be secured with respect to a first image (e.g., display image) by the first-path light L13, and a distortion problem may be prevented with respect to a second image (e.g., outside image) by the second-path light L23.

In addition, as in the present example embodiment, in the case of using the transparent image forming device TD10, since the configuration of the see-through type optical system ST13 may be simplified, the see-through type display apparatus may be miniaturized. Thus, the see-through type display apparatus having a compact configuration may be advantageously implemented. In some cases, since the wave plate WP10 may not be used, the configuration of the see-through type optical system ST13 may be further simplified and miniaturized.

Figure 14:
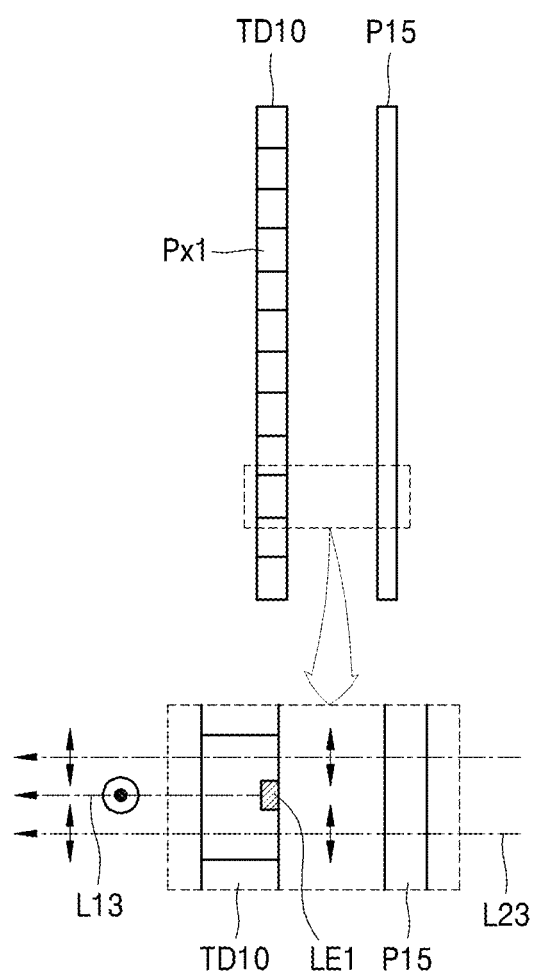
FIG. 14 is a cross-sectional view illustrating an example of the configuration of a transparent image forming device and a polarizer of FIG. 13.

FIG. 14 is a cross-sectional view illustrating an example of the configuration of the transparent image forming device TD10 and the polarizer P15 of FIG. 13.

Referring to FIG. 14, the transparent image forming device TD10 may include a plurality of pixels Px1 that are two-dimensionally arranged. Referring to a partial enlarged view of FIG. 14, each pixel Px1 of the transparent image forming device TD10 may include a light emitting element LE1. The light emitting element LE1 may be arranged at a center portion of the pixel Px1, and a pixel (Px1) region around the light emitting element LE1 may be transparent. The light emitting element LE1 may have self-luminous characteristics, and a light L13 for a first image may be generated from the light emitting element LE1. The transparent image forming device TD10 may have a polarization function. Thus, the light L13 for the first image may be polarized (linearly polarized) in a (1-1)th direction, for example, a direction perpendicular to a surface of the drawing sheet. For example, a polarization layer may be provided at an exit surface of the light emitting element LE1, and the light L13 may be polarized by the polarization layer in the (1-1)th direction. A second-path light L23 from outside the polarizer P15 may travel through the polarizer P15 and the transparent image forming device TD10. The second-path light L23 may be polarized (linearly polarized) by the polarizer P15 in a (2-1)th direction, for example, a direction orthogonal to the (1-1)th direction, and the polarized light L23 may travel through the transparent image forming device TD10. The second-path light L23 may travel through a transparent region around the light emitting element LE1. The detailed configurations of the transparent image forming device TD10 and the polarizer P15 described with reference to FIG. 14 are merely examples and may vary in various ways.

In the example embodiments of FIGS. 11 and 12, at least one of the lens may be further provided before or behind the image forming device D10. An example thereof is illustrated in FIG. 15.

Figure 15:
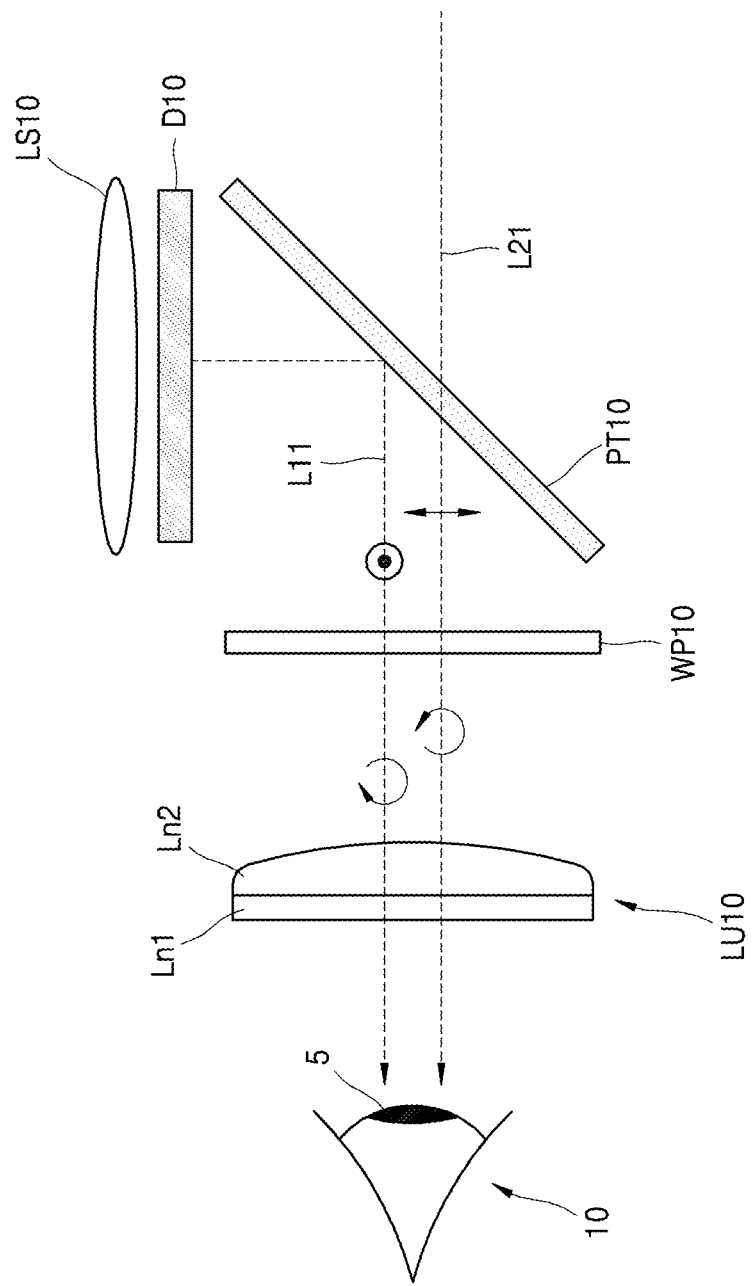
FIG. 15 illustrates an example of the configuration of a see-through type display apparatus according to another example embodiment.

FIG. 15 illustrates a case where a lens LS10 is further provided in a structure of FIG. 11. The lens LS10 may be arranged before (the top side of FIG. 15) the image forming device D10. Thus, the image forming device D10 may be arranged between the lens L510 and the polarization beam splitter PT10. A light source unit may be further provided before (the top side of FIG. 15) the lens L510. Since the lens unit LU10 functions as a lens with respect to the first-path light L11, the lens L510 may be referred to as an additional lens or an auxiliary lens. By using the additional lens L510, the numerical aperture (NA) and the focal length of an optical system may be adjusted. Herein, although it is illustrated that the lens LS10 is provided before the image forming device D10, the lens L510 may also be arranged behind the image forming device D10 (under the image forming device D10 on FIG. 15). For example, the lens LS10 may be arranged between the image forming device D10 and the polarization beam splitter PT10. One or more lenses may be provided both before and behind the image forming device D10. The shape of the additional lens LS10 illustrated in FIG. 15 is merely an example and may vary in various ways.

Figure 16:
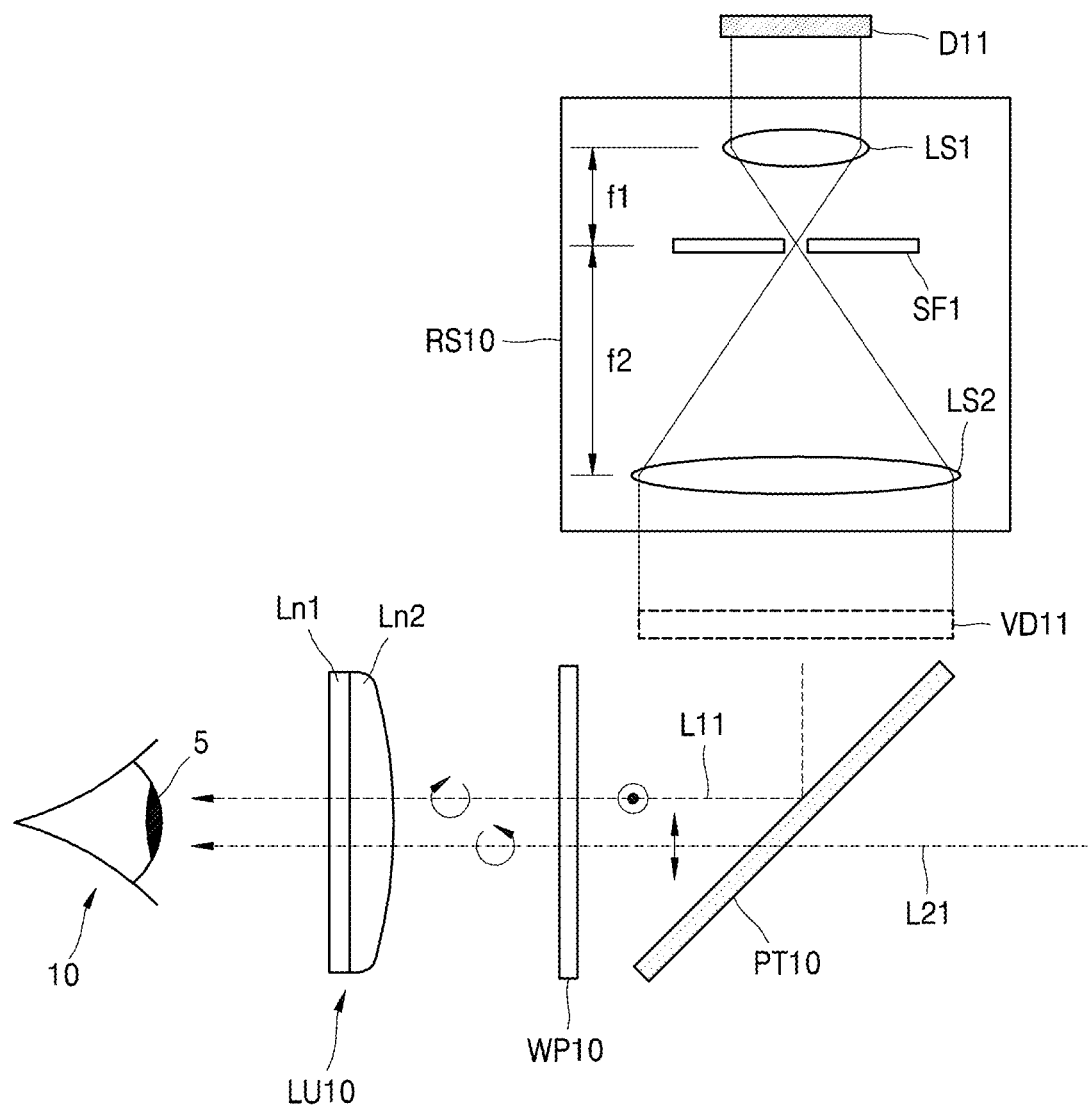
FIG. 16 illustrates an example of the configuration of a see-through type display apparatus according to another example embodiment.

FIG. 16 illustrates an example of the configuration of a see-through type display apparatus according to another example embodiment.

Referring to FIG. 16, the see-through type display apparatus according to the present example embodiment may be configured to form a virtual image VD11 of an image forming device D11. For example, a relay optical system RS10 may be used to form a virtual image VD11 of the image forming device D11. Hereinafter, the virtual image VD11 of the image forming device D11 will be referred to as a virtual image forming device VD11. The virtual image forming device VD11 may be an imaged SLM. The virtual image forming device VD11 may be formed in a region adjacent to the polarization beam splitter PT10.

The relay optical system RS10 may include, for example, a first relay lens LS1, a second relay lens LS2, and a spatial filter SF1 arranged therebetween. The first relay lens LS1 may have a first focal length f1, and the second relay lens LS2 may have a second focal length f2. The spatial filter SF1 may be located at or near the focal plane of the first and second relay lenses LS1 and LS2. The spatial filter SF1 may have an aperture such as a pinhole and may remove a noise in the light transmitted through the first relay lens LS1.

The first focal length f1 of the first relay lens LS1 and the second focal length f2 of the second relay lens LS2 may be equal to or different from each other. The size of the virtual image forming device VD11 may vary according to the relative size (i.e., ratio) between the first focal length f1 and the second focal length f2. For example, when the second focal length f2 is greater than the first focal length f1, the virtual image forming device VD11 may be larger than the real image forming device D11. When the first focal length f1 is greater than the second focal length f2, the virtual image forming device VD11 may be smaller than the real image forming device D11. Thus, by adjusting the first and second focal lengths f1 and f2, the size of the virtual image forming device VD11 may be controlled to a desired level. The user may see a display image obtained through the virtual image forming device VD11. However, the configuration of the relay optical system RS10 described herein is merely an example and may vary in various ways. As an example, a reflection member may be used to change the path of the light output from the relay optical system RS10. The virtual image forming device VD11 may be formed by the light reflected by the reflection member. In this case, the arrangement relationship between the relay optical system RS10 and the polarization beam splitter PT10 may vary from FIG. 16.

According to another example embodiment, at least one additional lens may be further provided in a structure of FIG. 16. An example thereof is illustrated in FIG. 17.

Figure 17:
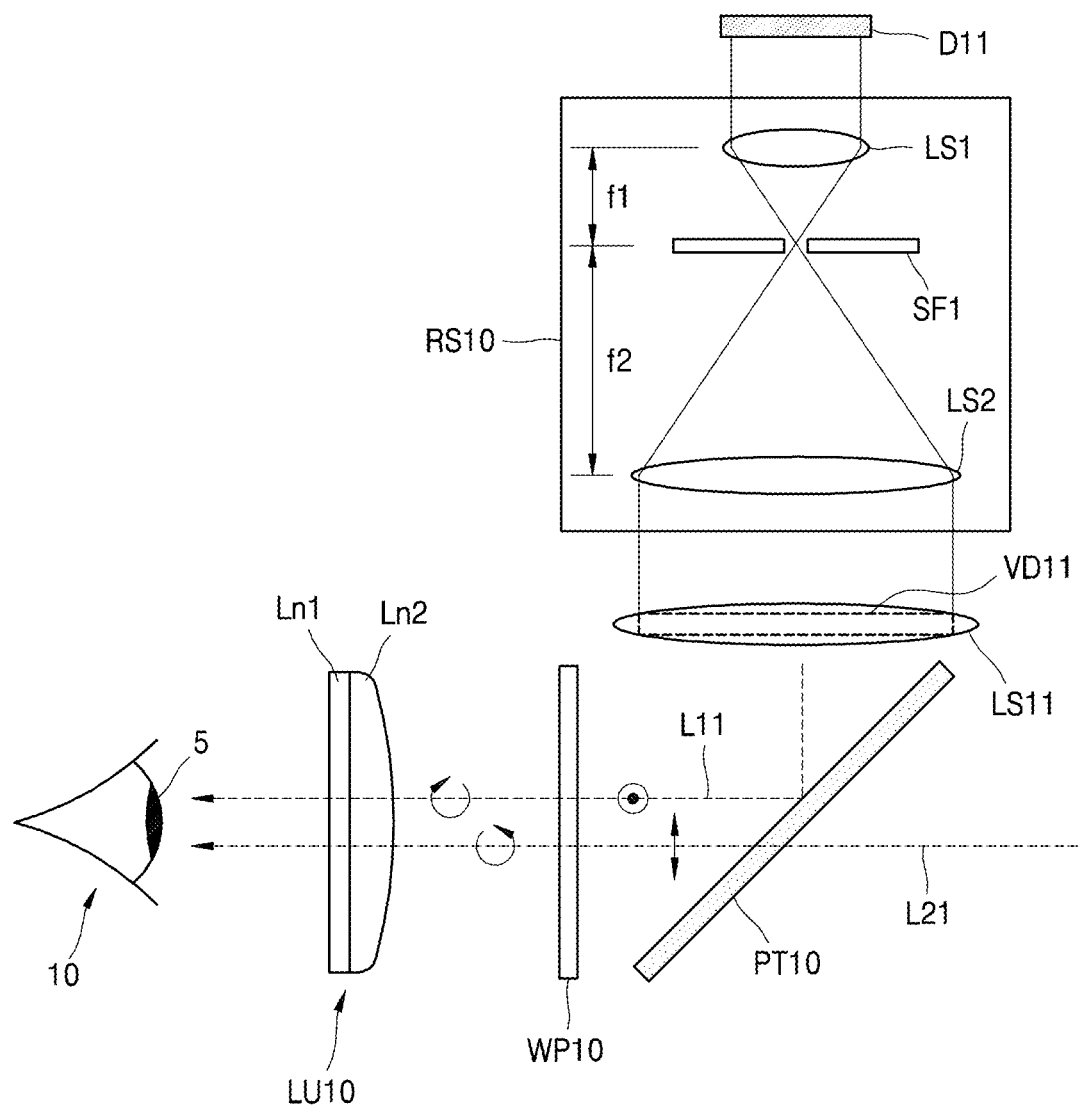
FIG. 17 illustrates an example of the configuration of a see-through type display apparatus according to another example embodiment.

Referring to FIG. 17, a lens LS11 may be further provided between the relay optical system RS10 and the polarization beam splitter PT10. The virtual image forming device VD11 may be formed at the lens LS11 or may be formed in a region adjacent to the lens LS11. Although FIG. 17 illustrates a case where the virtual image forming device VD11 is formed at the lens LS11, the virtual image forming device VD11 may also be formed before or behind the lens LS11. By using the additional lens LS11, the numerical aperture (NA) and the focal length of an optical system may be adjusted.

In the above example embodiments, although it has been described that the first-path light (e.g., L10 of FIG. 2A) is circularly polarized in the first direction and then incident on the lens unit (e.g., LU10 of FIG. 2A) and the second-path light (e.g., L20 of FIG. 2B) is circularly polarized in the second direction and then incident on the lens unit (e.g., LU10 of FIG. 2B), the polarization direction (the first polarization direction) of the first-path light and the polarization direction (the second polarization direction) of the second-path light may be modified in various ways. For example, the first-path light may be linearly polarized in the horizontal (or vertical) direction and then incident on the lens unit, and the second-path light may be linearly polarized in the vertical (or horizontal) direction and then incident on the lens unit. Since the lens unit functions as a lens or a flat plate according to light polarization, and since the construction of the lens may vary, the first polarization direction and the second polarization direction may not be limited to particular directions. For example, in FIG. 6, when the pattern of the nonlinear material elements n1 is properly modified, the lens unit (the compound lens unit) including the first lens Ln10A may function as a lens having a positive (+) focal length with respect to the incident light linearly-polarized in the horizontal (vertical) direction and may function as a flat plate with respect to the incident light linearly-polarized in the vertical (horizontal) direction. Also, in some cases, the lens unit (the compound lens unit) may function as a lens with respect to the left-handed circularly polarized (LHCP) incident light and may function as a flat plate with respect to the right-handed circularly polarized (RHCP) incident light. When the first polarization direction and the second polarization direction are orthogonal to each other, they may be applied to the lens unit according to example embodiments regardless of which directions the polarization directions are.

Figure 18A:
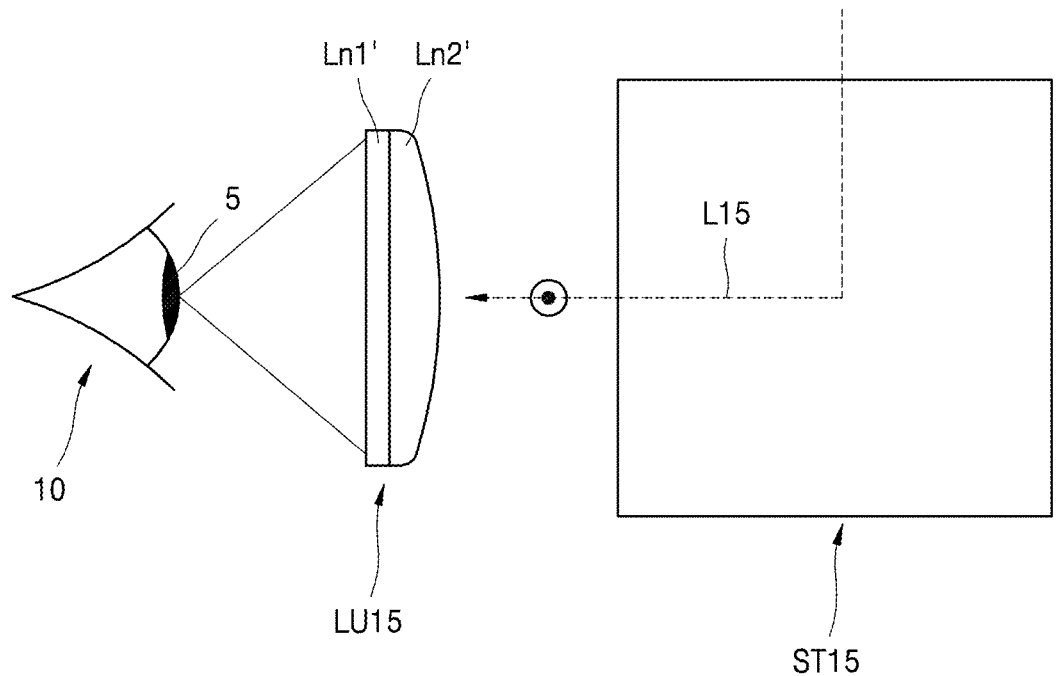
FIGS. 18A and 18B illustrate a see-through type display apparatus according to another example embodiment.
Figure 18B:
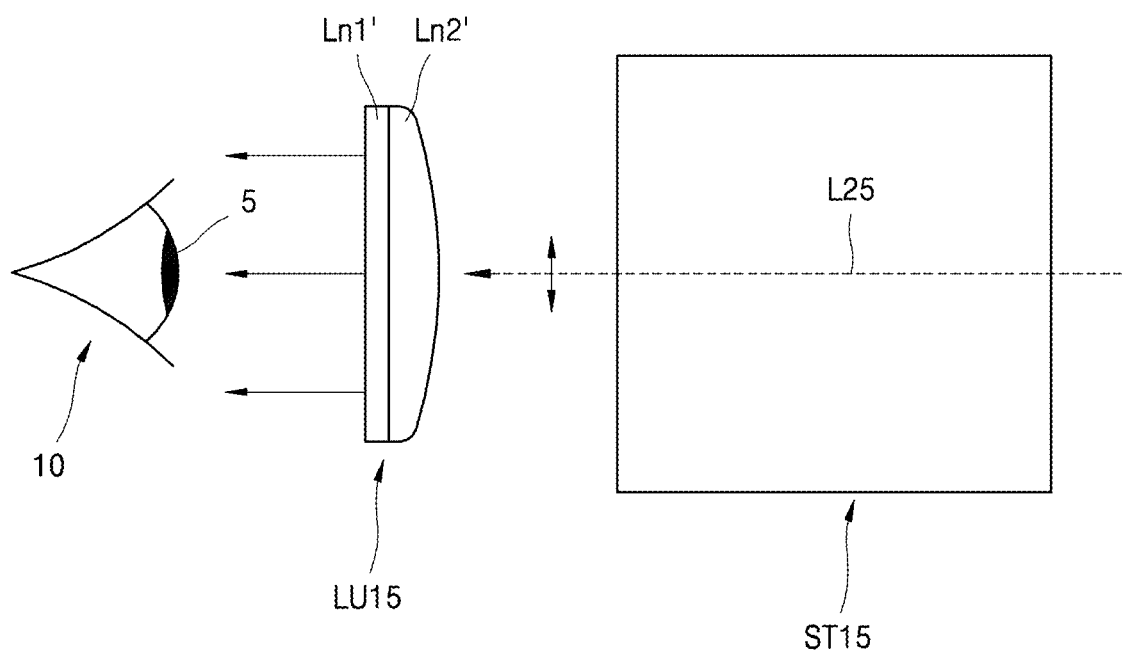

FIGS. 18A and 18B illustrate a see-through type display apparatus according to another example embodiment. FIGS. 18A and 18B illustrate a case of a change in the polarization direction of the light L10 and L20 in FIGS. 2A and 2B, respectively.

Referring to FIG. 18A, a first-path light L15 may be polarized in a first direction and then incident on a lens unit LU15. The lens unit LU15 may function as a lens with respect to the first-path light L15. Referring to FIG. 18B, a second-path light L25 may be polarized in a second direction and then incident on the lens unit LU15. The lens unit LU15 may function as a flat plate with respect to the second-path light L25. The first direction may be orthogonal to the second direction. For example, the first direction may be one of the horizontal and vertical directions, for example, the horizontal direction, and the second direction may be the other of the horizontal and vertical directions, for example, the vertical direction. According to the configurations of a first lens Ln1' and a second lens Ln2' constituting the lens unit LU15, the lens unit LU15 may function as a lens with respect to the light L15 polarized in the horizontal direction and function as a flat plate with respect to the light L25 polarized in the vertical direction.

In FIGS. 18A and 18B, a reference numeral ST15 denotes a see-through type optical system. The see-through type optical system ST15 may have a similar configuration to the see-through type optical systems ST11, ST12, and ST13 described with reference to FIGS. 11 to 17. However, the see-through type optical system ST15 may not include the wave plate WP10 in each of FIGS. 11 to 17. This omission may be because the see-through type optical system ST15 does not need to use the wave plate WP10 to circularly polarize the light. Thus, the configuration of the see-through type optical system ST15 may be simplified.

Figure 19:
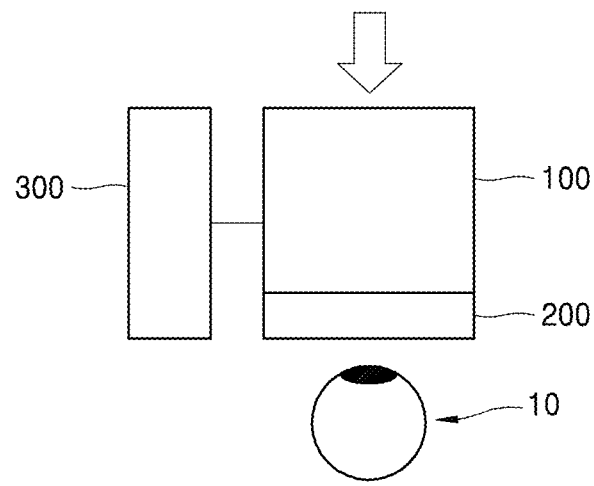
FIG. 19 is a block diagram schematically illustrating an overall structure or system of a see-through type display apparatus according to an example embodiment.

FIG. 19 is a block diagram schematically illustrating an overall structure or system of a see-through type display apparatus according to an example embodiment.

Referring to FIG. 19, a see-through type optical system 100 may be provided. A lens unit 200 may be provided between the see-through type optical system 100 and an ocular organ 10 of a user. The see-through type optical system 100 and the lens unit 200 may correspond respectively to the see-through type optical system and the lens unit described with reference to FIGS. 1 to 18. A controller 300 connected to the see-through type optical system 100 may be provided. The controller 300 may control, for example, an image forming device of the see-through type optical system 100. Although not illustrated, a light source unit may be further provided between the see-through type optical system 100 and the controller 300. In this case, the controller 300 may be connected to the see-through type optical system 100 and the light source unit.

The structure of FIG. 19 may be provided in one pair that is left-right symmetric. An example thereof is illustrated in FIG. 20.

Figure 20:
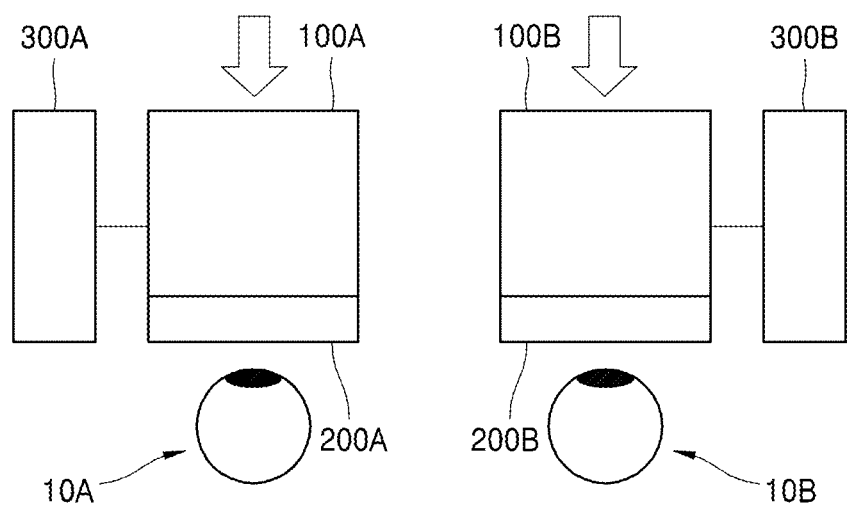
FIG. 20 is a block diagram schematically illustrating an overall structure or system of a see-through type display apparatus according to another example embodiment.

Referring to FIG. 20, a first see-through type optical system 100A, and a first lens unit 200A and a first controller 300A corresponding thereto may be provided. The first lens unit 200A may be arranged between the first see-through type optical system 100A and a first ocular organ 10A of a user. The first ocular organ 10A may be a left eye of the user. A second see-through type optical system 100B spaced apart from the first see-through type optical system 100A may be provided, and a second lens unit 200B and a second controller 300B corresponding thereto may be provided. The second lens unit 200B may be arranged between the second see-through type optical system 100B and a second ocular organ 10B of the user. The second ocular organ 10B may be a right eye of the user. Thus, the structure of FIG. 20 may be applied to a binocular display apparatus.

Figure 21:
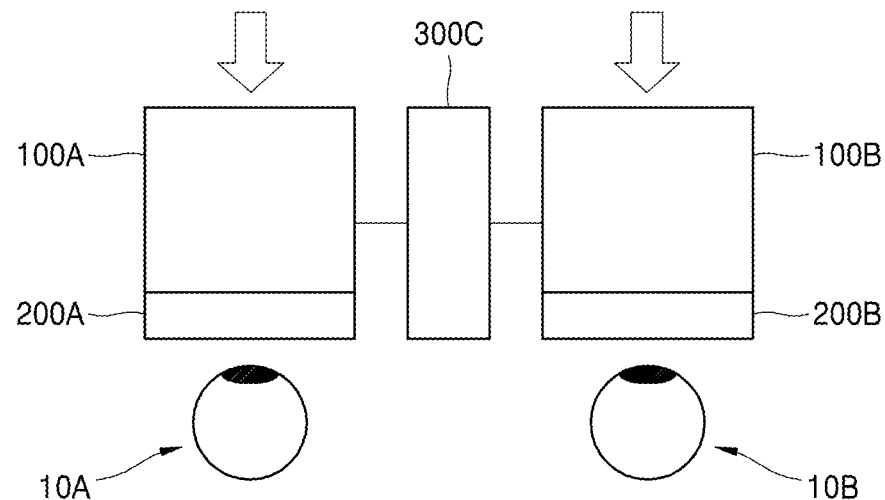
FIG. 21 is a block diagram schematically illustrating an overall structure or system of a see-through type display apparatus according to another example embodiment.

Although FIG. 20 illustrates that the first controller 300A and the second controller 300B are provided separately from each other, the first controller 300A and the second controller 300B may be integrated into a single controller. An example thereof is illustrated in FIG. 21. Referring to FIG. 21, first and second see-through type optical systems 100A and 100B may be connected to a controller 300C. The controller 300C may be arranged, for example, between the first see-through type optical system 100A and the second see-through type optical system 100B.

Figure 22:
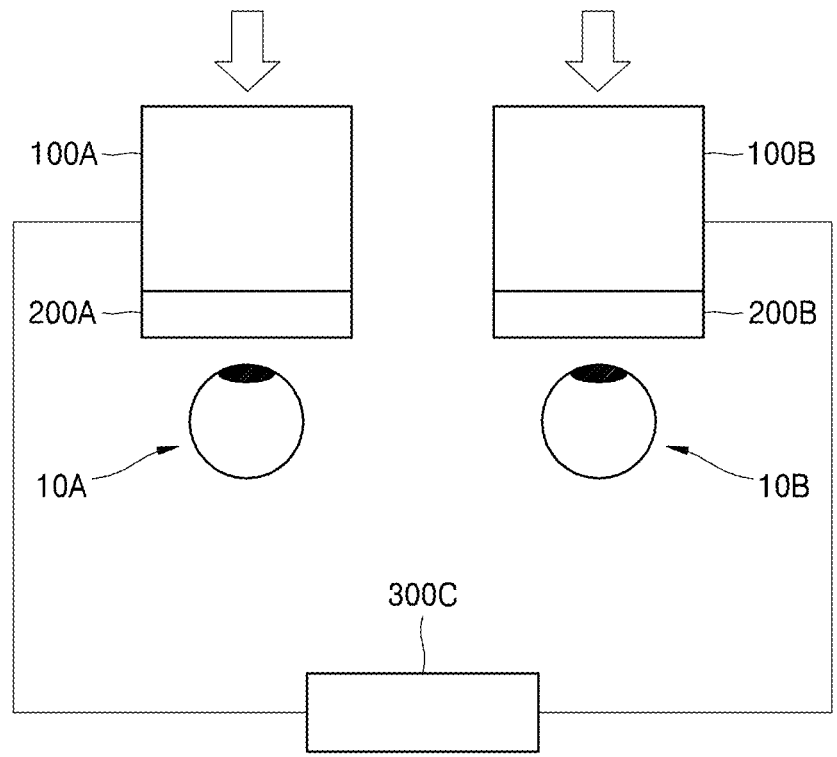
FIG. 22 is a block diagram schematically illustrating an overall structure or system of a see-through type display apparatus according to another example embodiment.

In FIG. 21, the position of the controller 300C may vary in various ways. An example thereof is illustrated in FIG. 22. FIG. 22 illustrates an example of another position of the controller 300C. The position of the controller 300C may vary in various ways. Also, in some cases, the controller 300C may be connected to the first and second see-through type optical systems 100A and 100B in a wireless manner, not in a wired manner.

Figure 23:
FIGS. 23, 24, and 25 illustrate various electronic apparatuses to which see-through type display apparatuses according to example embodiments are applicable.
Figure 24:
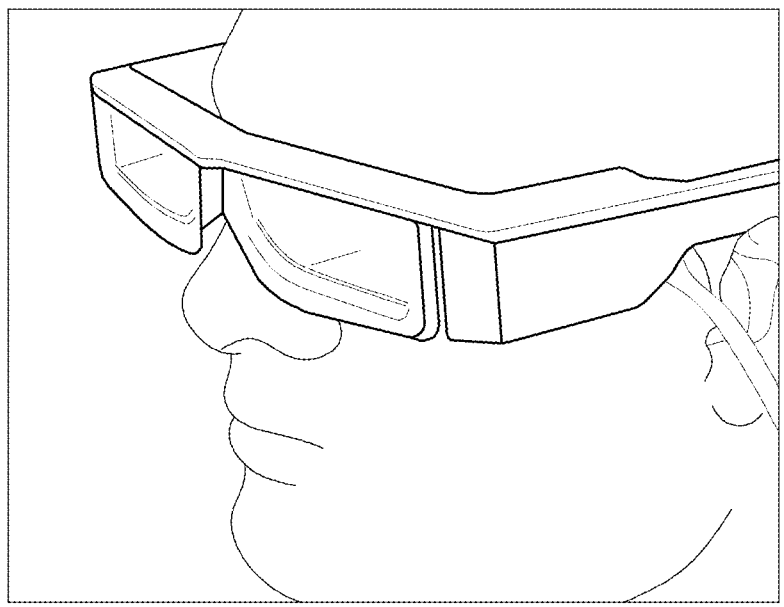
Figure 25:
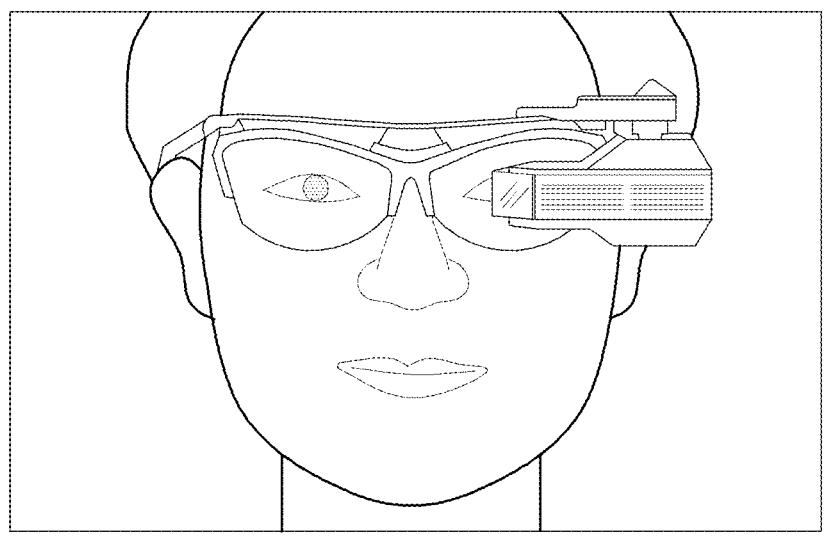

At least a portion of the see-through type display apparatuses according to various example embodiments may constitute a wearable device. In other words, the see-through type display apparatus may be applied to a wearable device. As an example, the see-through type display apparatus may be applied to a head mounted display (HMD). Also, the see-through type display apparatus may be applied to a glasses-type display or a goggle-type display. FIGS. 23 to 25 illustrate various electronic apparatuses to which see-through type display apparatuses according to example embodiments are applicable. The electronic apparatuses of FIGS. 23 to 25 are examples of the HMD, the glasses-type display, and the like. The wearable electronic apparatuses illustrated in FIGS. 23 to 25 may be operated in linkage with (or in connection with) smart phones.

In addition, the see-through type display apparatuses according to various example embodiments may be provided in smart phones, and the smart phone may be used as the see-through type display apparatus. In other words, the see-through type display apparatus may be applied to compact electronic apparatuses (or mobile electronic apparatuses), not to the wearable devices illustrated in FIGS. 23 to 25. The various technology fields to which the see-through type display apparatuses according to the above example embodiments may be applied is varied. Also, the see-through type display apparatuses according to the above example embodiments may be not only be used to implement augmented reality (AR) or mixed reality (MR), but also may be applied to other fields. For example, the inventive concept of the present example embodiments may be applied to multi-image displays capable of simultaneously displaying a plurality of images.

Although many details have been described above, they are not intended to limit the scope of the inventive concept, and instead should be interpreted as descriptive examples. For example, those of ordinary skill in the art will understand that the configurations of the lens units (or the compound lens units) and the see-through type display apparatuses described with reference to FIGS. 1 to 25 may be modified in various ways. As an example, a plurality of lenses (e.g., Ln1 and Ln2) constituting a lens unit (or a compound lens unit) may be spaced apart from each other, and a transparent medium may be provided between the plurality of lenses (e.g., Ln1 and Ln2). Also, the absolute value of a positive (+)-direction focal length (e.g., $f_1$ in FIG. 3A) of the lens and the absolute value of a negative (−)-direction focal length (e.g., $f_2$ in FIG. 3B) of the lens may be different from each other. Also, the configurations of the see-through type optical systems may be modified in various ways. Furthermore, the lens units (or the compound lens units) may be applied to many other fields other than see-through type display apparatuses, and the application fields of the see-through type display apparatuses may vary in various ways.

While one or more example embodiments have been described with reference to the figures, it will be understood by those of ordinary skill in the art that various changes in form and details may be made therein without departing from the spirit and scope as defined by the following claims.

What is claimed is:

1. A see-through type display apparatus comprising:
a see-through type optical system configured to transmit a first image via a first-path light, which is light traveling on a first path, to an ocular organ of a user, and a second image via a second-path light, which is light traveling on a second path, to the ocular organ of the user; and
an incident light-dependent lens unit provided between the see-through type optical system and the ocular organ of the user and having different refractive powers according to a polarization characteristic of incident light,
wherein the incident light-dependent lens unit has a positive first refractive power with respect to the first-path light and has a second refractive power with respect to the second-path light, and the second refractive power is different from the positive first refractive power,
wherein the incident light-dependent lens unit comprises:
a first element configured to have a variable focal length according to the polarization characteristic of the incident light; and
a second element having a constant focal length regardless of the polarization characteristic of the incident light,
wherein the see-through type optical system comprises:
a transparent image forming device configured to form the first image; and
a polarizer facing the incident light-dependent lens unit with the transparent image forming device interposed between the polarizer and the incident light-dependent lens unit, and wherein the second image is transmitted through the transparent image forming device to the ocular organ of the user.

2. The see-through type display apparatus of claim 1, wherein the incident light-dependent lens unit has a refractive power equal to 0 or substantially equal to 0 with respect to the second-path light.

3. The see-through type display apparatus of claim 1, wherein the incident light-dependent lens unit is configured to have different refractive powers according to polarization directions of the incident light.

4. The see-through type display apparatus of claim 1, wherein the first element is a first lens having a focal length that varies according to polarization directions of the incident light; and
   wherein the second element is a second lens provided adjacent to the first lens and having the constant focal length regardless of the polarization directions of the incident light.

5. The see-through type display apparatus of claim 4, wherein the first lens is a convex lens, and
   the second lens is a flat plate type lens.

6. The see-through type display apparatus of claim 4, wherein the first lens has a positive first focal length with respect to the first-path light when the first-path light is incident on the first lens and has a first polarization direction,
   the first lens has a negative second focal length with respect to the second-path light when the second-path light is incident on the first lens and has a second polarization direction,
   the second lens has a positive third focal length with respect to the first-path light when the first-path light is incident on the second lens and has the first polarization direction, and
   the second lens has the positive third focal length with respect to the second-path light when the second-path light is incident on the second lens and has the second polarization direction.

7. The see-through type display apparatus of claim 6, wherein an absolute value of the positive first focal length and an absolute value of the negative second focal length are equal to each other.

8. The see-through type display apparatus of claim 6, wherein an absolute value of the negative second focal length and an absolute value of the positive third focal length are equal to each other.

9. The see-through type display apparatus of claim 6, wherein the incident light-dependent lens unit has a focal length corresponding to half of the positive first focal length with respect to the first-path light having the first polarization direction, and
   the incident light-dependent lens unit has an infinite or substantially infinite focal length with respect to the second-path light having the second polarization direction.

10. The see-through type display apparatus of claim 6, wherein the first polarization direction and the second polarization direction are orthogonal to each other.

11. The see-through type display apparatus of claim 1, wherein the first image is an image formed and provided by the see-through type display apparatus, and
   the second image is an external image that the user faces through the see-through type display apparatus.

12. The see-through type display apparatus of claim 1, wherein the see-through type optical system further comprises a quarter-wave plate (QWP) provided between the transparent image forming device and the incident light-dependent lens unit.

13. The see-through type display apparatus of claim 1, wherein the see-through type display apparatus has an angle of view greater than or equal to about 40°.

14. The see-through type display apparatus of claim 1, wherein the see-through type display apparatus is configured to implement augmented reality or mixed reality.

15. The see-through type display apparatus of claim 1, wherein the see-through type display apparatus is a head mounted display.

16. The see-through type display apparatus of claim 1, wherein the see-through type display apparatus is a glasses-type display or a goggle-type display.

17. A see-through type display apparatus comprising:
   a see-through type optical system configured to transmit a first image via a first-path light, which is light traveling on a first path, to an ocular organ of a user, and a second image via a second-path light, which is light traveling on a second path, to the ocular organ of the user; and
   an incident light-dependent lens unit provided between the see-through type optical system and the ocular organ of the user and having different refractive powers according to a polarization characteristic of incident light,
   wherein the incident light-dependent lens unit has a positive first refractive power with respect to the first-path light and has a second refractive power with respect to the second-path light, and the second refractive power is different from the positive first refractive power,
   wherein the incident light-dependent lens unit comprises:
      a first element configured to have a variable focal length according to the polarization characteristic of the incident light; and
      a second element having a constant focal length regardless of the polarization characteristic of the incident light,
   wherein the see-through type optical system comprises:
      an image forming device configured to form the first image;
      a transflective member configured to reflect the first image formed by the image forming device to the ocular organ of the user;
      a first polarizer provided between the transflective member and the image forming device; and
      a second polarizer facing the incident light-dependent lens unit with the transflective member interposed between the second polarizer and the incident light-dependent lens unit, and
   wherein the second image is transmitted through the transflective member to the ocular organ of the user.

18. The see-through type display apparatus of claim 17, wherein the see-through type optical system further comprises a quarter-wave plate (QWP) provided between the transflective member and the incident light-dependent lens unit.

* * * * *